US010835096B2

(12) United States Patent
O'Dea et al.

(10) Patent No.: US 10,835,096 B2
(45) Date of Patent: Nov. 17, 2020

(54) MAP BASED TRAINING AND INTERFACE FOR MOBILE ROBOTS

(71) Applicant: iRobot Corporation, Bedford, MA (US)

(72) Inventors: Stephen O'Dea, Bedford, MA (US); Benjamin H. Schriesheim, Somerville, MA (US); Qunxi Huang, Somerville, MA (US); Kenrick E. Drew, Northborough, MA (US); Adam Goss, Lincoln, MA (US)

(73) Assignee: iRobot Corporation, Bedford, MA (US)

( * ) Notice: Subject to any disclaimer, the term of this patent is extended or adjusted under 35 U.S.C. 154(b) by 6 days.

(21) Appl. No.: 16/117,484

(22) Filed: Aug. 30, 2018

(65) Prior Publication Data

US 2020/0069138 A1 Mar. 5, 2020

(51) Int. Cl.
*A47L 11/40* (2006.01)
*G01C 21/00* (2006.01)
(Continued)

(52) U.S. Cl.
CPC ........ *A47L 11/4011* (2013.01); *G01C 21/206* (2013.01); *G01C 21/383* (2020.08);
(Continued)

(58) Field of Classification Search
CPC .. G05D 1/0088; G05D 1/0221; G05D 1/0274; G05D 2201/0203;
(Continued)

(56) References Cited

U.S. PATENT DOCUMENTS 7,693,654 B1 *   4/2010   Dietsch ................. G01C 21/20
                                                                      701/461
8,972,052 B2     3/2015   Chiappetta
(Continued)

FOREIGN PATENT DOCUMENTS

JP       2002085305 A  *  3/2002  ........... G05D 1/0246
WO   WO-2018/131884 A1  *  7/2018

OTHER PUBLICATIONS

John Deere, "Greenstar(TM) 3 2630 display" Operator's Manual, Copyright (C) 2013, Deere & Co., 402 pages (Year: 2013).*
(Continued)

*Primary Examiner* — Faris S Almatrahi
*Assistant Examiner* — David A Testardi
(74) *Attorney, Agent, or Firm* — Fish & Richardson P.C.

(57) ABSTRACT

A method of operating an autonomous cleaning robot is described. The method includes initiating a training run of the autonomous cleaning robot and receiving, at a mobile device, location data from the autonomous cleaning robot as the autonomous cleaning robot navigates an area. The method also includes presenting, on a display of the mobile device, a training map depicting portions of the area traversed by the autonomous cleaning robot during the training run and presenting, on the display of the mobile device, an interface configured to allow the training map to be stored or deleted. The method also includes initiating additional training runs to produce additional training maps and presenting a master map generated based on a plurality of stored training maps.

26 Claims, 17 Drawing Sheets

(51) Int. Cl.
    *G05D 1/02*           (2020.01)
    *G05D 1/00*           (2006.01)
    *G09B 5/02*           (2006.01)
    *G01C 21/20*          (2006.01)

(52) U.S. Cl.
    CPC .......... *G05D 1/0044* (2013.01); *G05D 1/0088* (2013.01); *G05D 1/0221* (2013.01); *G05D 1/0274* (2013.01); *G09B 5/02* (2013.01); *A47L 2201/04* (2013.01); *A47L 2201/06* (2013.01); *G05D 2201/0203* (2013.01)

(58) Field of Classification Search
    CPC .......... G05D 2201/0215; G05D 1/0044; A47L 11/4011; A47L 2201/04; G01C 21/206; G01C 21/383
    See application file for complete search history.

(56) References Cited

U.S. PATENT DOCUMENTS

| | | | |
|---|---|---|---|
| 9,008,835 B2 | 4/2015 | Dubrovsky | |
| 9,527,212 B2* | 12/2016 | Artes | .................... B25J 9/1692 |
| 9,717,387 B1 | 8/2017 | Szatmary et al. | |
| 2004/0096083 A1* | 5/2004 | Matsunaga | ................. B25J 5/00 |
| | | | 382/104 |
| 2005/0182518 A1* | 8/2005 | Karlsson | ............. G05D 1/0246 |
| | | | 700/253 |
| 2005/0188495 A1* | 9/2005 | Takenaka | .............. A47L 9/2805 |
| | | | 15/319 |
| 2014/0207281 A1* | 7/2014 | Angle | ................... H04L 12/282 |
| | | | 700/257 |
| 2014/0207282 A1* | 7/2014 | Angle | ................... G05B 15/02 |
| | | | 700/257 |
| 2015/0212520 A1* | 7/2015 | Artes | ................... G05D 1/0219 |
| | | | 701/2 |
| 2016/0008982 A1* | 1/2016 | Artes | .................... B25J 9/1692 |
| | | | 700/254 |
| 2016/0297545 A1* | 10/2016 | Yang | ..................... B64D 47/08 |
| 2017/0131721 A1* | 5/2017 | Kwak | .................... B25J 9/1664 |
| 2017/0235312 A1* | 8/2017 | Yoshino | ................ A47L 11/283 |
| | | | 700/258 |
| 2017/0265703 A1* | 9/2017 | Park | ......................... A47L 9/28 |
| 2017/0273527 A1* | 9/2017 | Han | ..................... A47L 9/2805 |
| 2017/0329347 A1* | 11/2017 | Passot | ................ A47L 11/4011 |
| 2017/0361468 A1* | 12/2017 | Cheuvront | ............ A47L 9/2857 |
| 2018/0074508 A1* | 3/2018 | Kleiner | ................. A47L 9/0488 |
| 2018/0232134 A1* | 8/2018 | Ebrahimi Afrouzi | ....................... B25J 13/006 |
| 2018/0281191 A1* | 10/2018 | Sinyavskiy | ......... A47L 11/4011 |
| 2018/0344116 A1* | 12/2018 | Schriesheim | ......... A47L 9/2857 |
| 2018/0354132 A1* | 12/2018 | Noh | ....................... A47L 9/2826 |
| 2018/0373242 A1* | 12/2018 | Han | ........................ A47L 9/009 |
| 2019/0061157 A1* | 2/2019 | Suvarna | ................. B25J 9/1697 |
| 2019/0133397 A1* | 5/2019 | Choe | .......................... A47L 9/28 |
| 2019/0184981 A1* | 6/2019 | Jung | ....................... G06K 9/00812 |
| 2019/0332115 A1* | 10/2019 | Lim | ....................... A47L 9/0477 |
| 2019/0332121 A1* | 10/2019 | Kim | ..................... G05D 1/0214 |

OTHER PUBLICATIONS

MiR robot interface 2.0 Reference Guide, version 1.3, Jan. 2018, 125 pages (Year: 2018).*
International Search Report and Written Opinion in Appln. No. PCT/US2019/47652, dated Oct. 12, 2019, 7 pages.
"Neato All-Floor Robotic Vacuum User's Guide," Neato Robotics, Inc., 2011, 174 pages.
"Neato Botvac Connected" Product Manual, Neato Robotics, Inc., 52 pages, (2015).

* cited by examiner

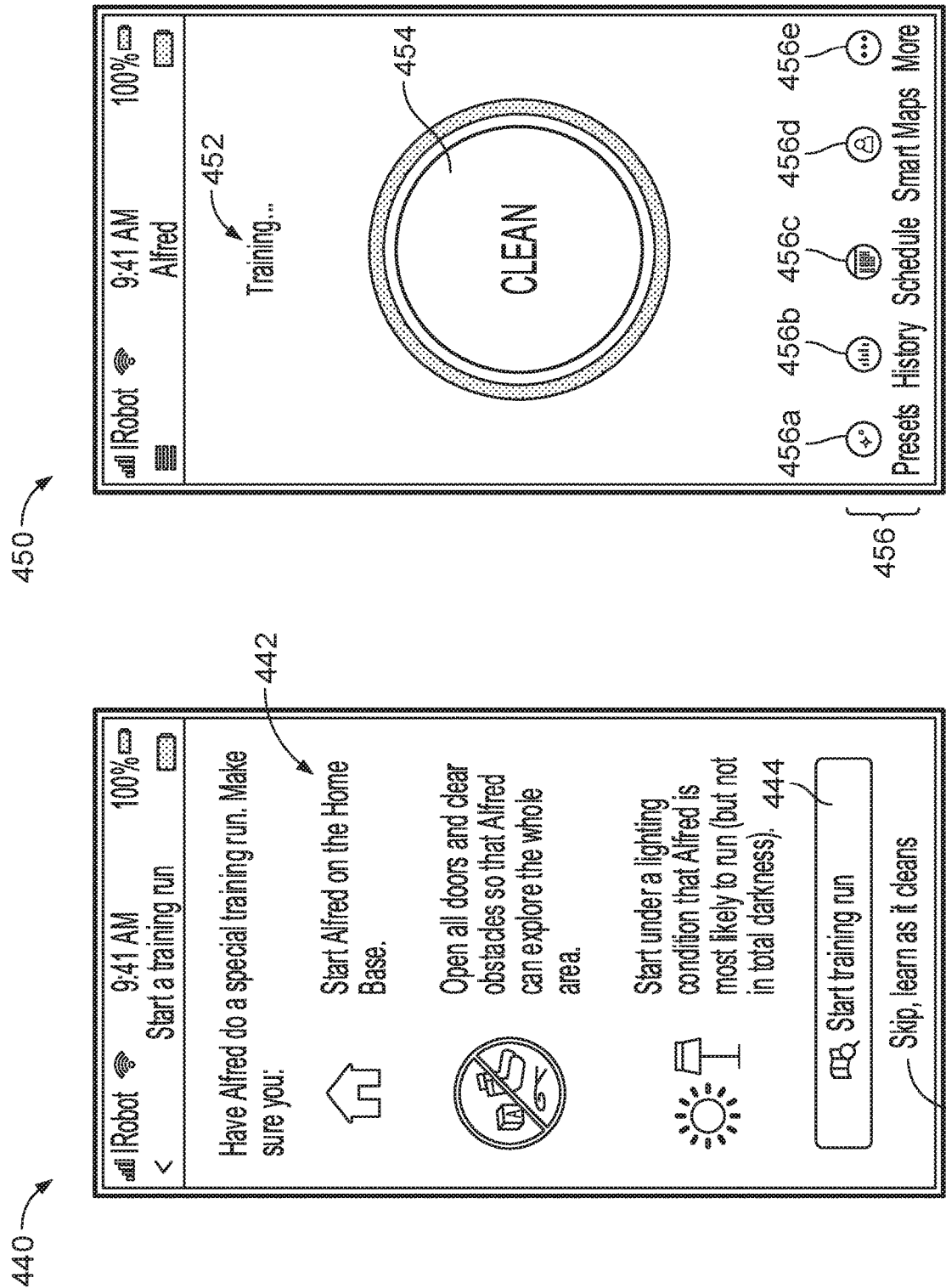

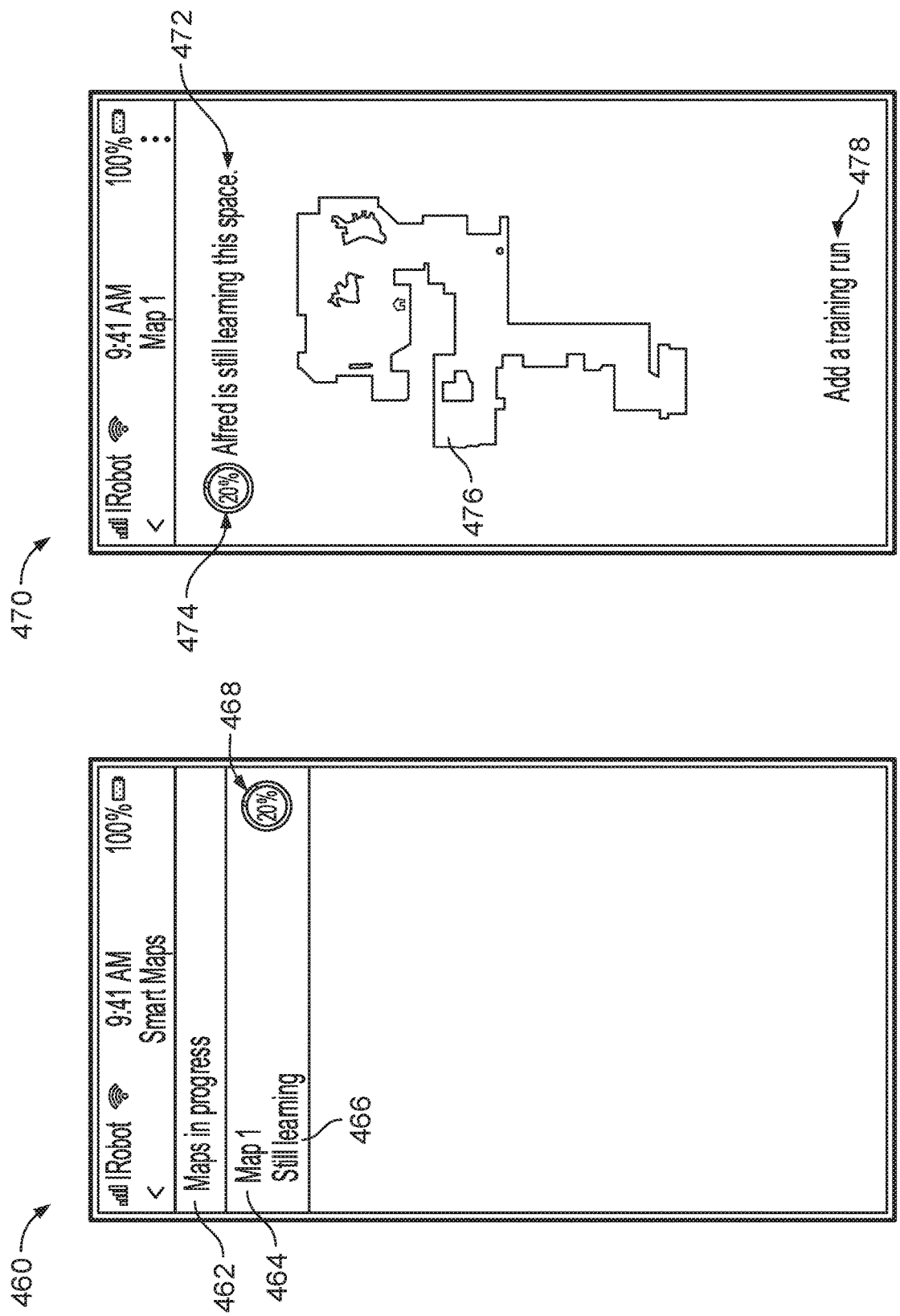

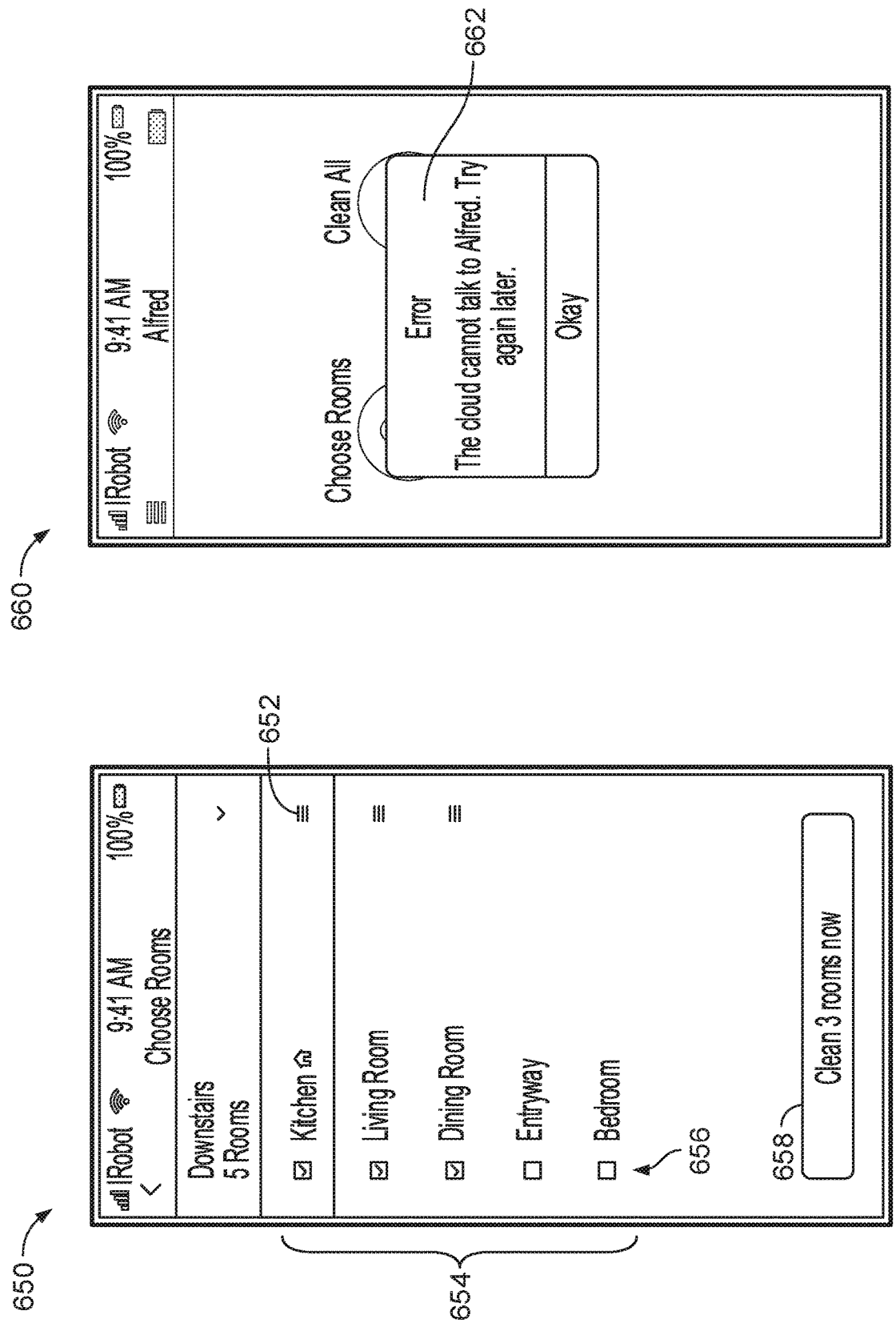

MAP BASED TRAINING AND INTERFACE FOR MOBILE ROBOTS

TECHNICAL FIELD

This specification relates generally to training and control systems for autonomous cleaning robots. In one exemplary system, selectable and editable maps are used for training and controlling an autonomous cleaning robot.

BACKGROUND

Cleaning robots include mobile robots that autonomously perform cleaning tasks within an environment, e.g., a home. Many kinds of cleaning robots are autonomous to some degree and in different ways. The cleaning robots include a controller that is configured to autonomously navigate the cleaning robot about the environment such that the cleaning robot can ingest debris as it moves.

SUMMARY

A mobile application can be used to monitor a status of an autonomous cleaning robot as it executes a mission and review the performance of the autonomous cleaning robot upon completion of the mission. The mobile application includes an interface configured to present a map displaying areas traversed by the autonomous cleaning robot during the mission and may allow a user to store or delete the map. The mobile application also includes an editable master map generated based on a plurality of maps generated during individual training missions and then stored by the user.

Described herein are examples of methods and devices for training and using mobile robots configured to traverse floor surfaces and perform various operations including, but not limited to, cleaning. Advantages of the foregoing may include, but are not limited to, those described below and herein elsewhere.

The generation of a master map from a plurality of training maps allows a user to perform on demand cleaning of particular areas (e.g., rooms, floors) of the user's home. For example, the user may direct the autonomous cleaning robot to clean the entire downstairs or just the master bedroom. On demand cleaning is especially useful, for example, if the user is having guests over to his/her home and needs the kitchen, living room, and bathroom cleaned before guests arrive, as the user may select just those rooms for cleaning.

In one aspect, a method of operating an autonomous cleaning robot is described. The method includes initiating a training run of the autonomous cleaning robot. The method also includes receiving, at a mobile device, location data from the autonomous cleaning robot as the autonomous cleaning robot navigates an area. The method also includes presenting, on a display of the mobile device, a training map depicting portions of the area traversed by the autonomous cleaning robot during the training run. The method also includes presenting, on the display of the mobile device, an interface configured to allow the training map to be stored or deleted. The method also includes initiating additional training runs to produce additional training maps. The method also includes presenting a master map generated based on a plurality of stored training maps.

In some implementations, the method also includes presenting, on the display of the mobile device, a numerical value representing the stored training maps or a percentage of stored training maps relative to a number of training maps used to generate the master map.

In some implementations, the method also includes merging portions of the master map to identify a portion of the master map as a room.

In some implementations, the method also includes splitting portions of the master map to identify a portion of the master map as multiple rooms.

In some implementations, the method also includes assigning an editable label comprising a room name to a portion of the master map. In some instances, the room represented by the editable label is added to a list of rooms. In some instances, the list of rooms is one of a plurality of lists configured to be presented on the display and corresponds to a floor level of the area. In some instances, rooms on the list are selectable for inclusion in or deselectable for exclusion from a cleaning mission. In some instances, the method also includes initiating a transmission to the autonomous cleaning robot comprising instructions to clean the rooms selected on the list. In some instances, the method also includes presenting, on the display of the mobile device, a number of rooms to be cleaned in a user-selectable button, wherein selecting the user-selectable button initiates a transmission to the autonomous cleaning robot to begin cleaning.

In some implementations, the master map is produced after five training maps have been stored.

In some implementations, the method also includes presenting, on the display of the mobile device, an option to begin the training run.

In some implementations, the method also includes presenting, on the display of the mobile device, a list of items to be completed by a user prior to initiating the training run.

In another aspect, a handheld computing device is described. The device includes one or more input devices, a display, and a processor. The processor is configured to initiate data transmission and reception with an autonomous cleaning robot. The processor is also configured to present, on the display, a graphical representation of a training map depicting portions of an area traversed by the autonomous cleaning robot during a training run. The processor is also configured to present, on the display, an interface allowing the training map to be stored or deleted. The processor is also configured to initiate additional training runs to produce additional training maps. The processor is also configured to present a master map generated based on a plurality of stored training maps.

In some implementations, the processor is configured to present, on the display, a numerical value representing the stored training maps or a percentage of stored training maps relative to a number of training maps used to generate the master map.

In some implementations, the processor is configured to allow merging portions of the master map to identify a portion of the master map as a room.

In some implementations, the processor is configured to allow splitting portions of the master map to identify a portion of the master map as multiple rooms.

In some implementations, the processor is configured to allow assigning an editable label to a portion of the master map, the editable label comprising a room name. In some instances, the processor is further configured to present, on the display, the room represented by the editable label on a list of rooms. In some instances, the list of rooms is one of a plurality of lists configured to be presented on the display and corresponds to a floor level of the area. In some instances, the rooms on the list are selectable for inclusion in or deselectable for exclusion from a cleaning mission. In some instances, the processor is further configured to initiate transmission to the autonomous cleaning robot comprising instructions to clean the rooms selected from the list. In some instances, the processor is further configured to present, on the display, a number of rooms to be cleaned in a user-selectable button, wherein selecting the user-selectable button initiates a transmission to the autonomous cleaning robot to begin cleaning.

In some implementations, the master map is produced after five training maps have been stored.

In some implementations, the processor is further configured to present, on the display, an option to begin the training run.

In some implementations, the processor is further configured to present, on the display, a list of items to be completed by a user prior to initiating the training run.

The details of one or more implementations are set forth in the accompanying drawings and the description below. Other features and advantages will be apparent from the description and drawings, and from the claims.

BRIEF DESCRIPTION OF DRAWINGS

FIGS. 4A-4I are interfaces of a mobile application for initiating a training run and evaluating the performance of an autonomous cleaning robot during a training run.

FIGS. 6A-6H are interfaces of a mobile application for selecting areas to be cleaned by the autonomous cleaning robot of FIG. 1.

DETAILED DESCRIPTION

A mobile application can be used to monitor a status of an autonomous cleaning robot as it executes a mission and to review the performance of the autonomous cleaning robot upon completion of the mission. A mission may be considered a goal attained by executing operations associated with the autonomous cleaning robot. For example, during a cleaning mission, the autonomous cleaning robot performs a cleaning operation (e.g., sweeping, mopping, vacuuming, etc.) in an area as the autonomous cleaning robot traverses the area. In another example, during a training mission, the autonomous cleaning robot gathers location data as it traverses an area, but does not perform cleaning operations. Location data gathered during a training mission is used to create a training map representing locations traversed by the autonomous cleaning robot during the training run. After a plurality of training maps are stored by a user, a master map is generated that is representative of the location data in the stored training maps.

The master map is editable and allows a user to customize (e.g., label, resize, reshape, etc.) particular rooms displayed on the master map. Labels applied to areas on the master map are compiled into a list from which a user can select rooms or floors for inclusion in a cleaning mission. In some examples, through the mobile application, the user can manage operations for the autonomous cleaning robot (e.g., select cleaning parameters, schedule the autonomous cleaning robot, view a cleaning status of the autonomous cleaning robot, etc.).

Figure 1:
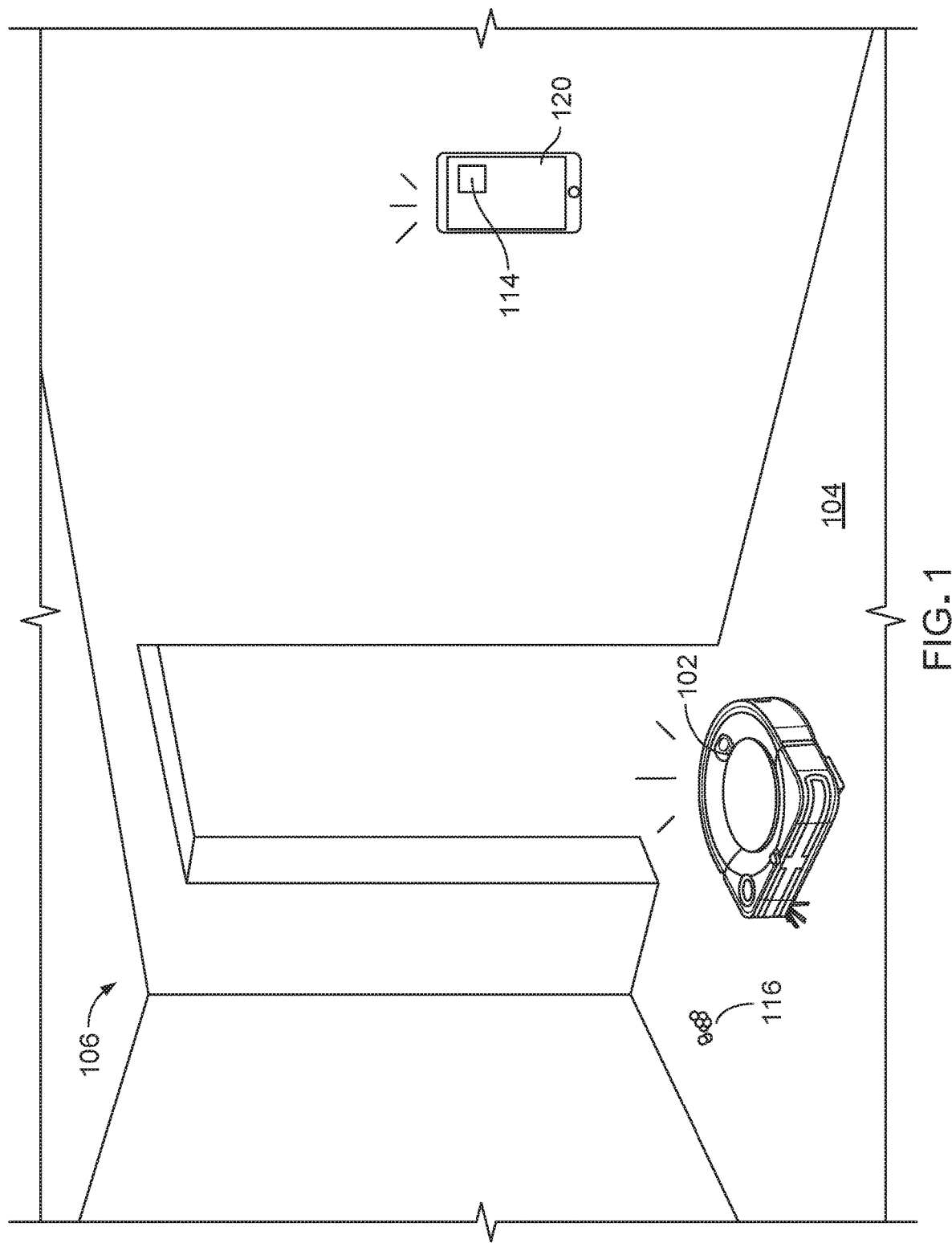
FIG. 1 illustrates a system for training and controlling an autonomous cleaning robot using a handheld computing device.

Referring to FIG. 1, an autonomous cleaning robot 102 is located on a floor surface 104 within a room 106. The autonomous cleaning robot 102 is configured to communicate with a mobile device 120. A mobile device 120 as described herein may include a smart phone, a cellular phone, personal digital assistant, laptop computer, tablet, smart watch, or other portable (e.g., handheld) computing device capable of transmitting and receiving signals related to a robot cleaning mission. The mobile device 120 is configured to present, on a display, information relating to a robot training run or cleaning mission and receive an input from a user. The mobile device 120 includes a processor 114 configured to initiate data transmission and reception (directly, via the internet, etc.) with the autonomous cleaning robot 102 and present graphical maps generated from data collected by the autonomous cleaning robot 102.

The autonomous cleaning robot 102 is configured to transmit data representing locations traversed by the autonomous cleaning robot 102 during a mission (e.g., a cleaning mission, a training mission, etc.). The maps presented on the mobile device 120 include training maps generated from location data gathered by the autonomous cleaning robot 102 during training runs. The maps presented on the mobile device 120 also include a master map generated from stored training maps. In some examples, the master map may be a compilation of location data from the stored training maps.

The autonomous cleaning robot 102 includes a vacuum assembly 216 (shown in FIG. 2) and uses suction to ingest debris 116 as the autonomous cleaning robot 102 traverses the floor surface 104. In some implementations, the autonomous cleaning robot 102 may be a mopping robot which may include a cleaning pad for wiping or scrubbing the floor surface 104. In some implementations, the autonomous cleaning robot includes both a vacuum assembly and a mopping assembly. As the autonomous cleaning robot 102 performs a cleaning task (e.g., vacuuming, mopping, etc.) during a cleaning mission, the autonomous cleaning robot 102 sends location information to the mobile device 120 (either directly or via the internet). The processor 114 of the mobile device 120 is configured to present, on a display of the mobile device 120, a map representing the location information. During a training run, the autonomous cleaning robot 102 may not perform cleaning tasks. In some instances, during a training run, the autonomous cleaning robot may perform fewer cleaning tasks than would typically be performed during a cleaning mission (e.g., not performing edge cleaning, not performing spot cleaning, operating at a single vacuum power, operating with no vacuum power, etc.).

Figure 2:
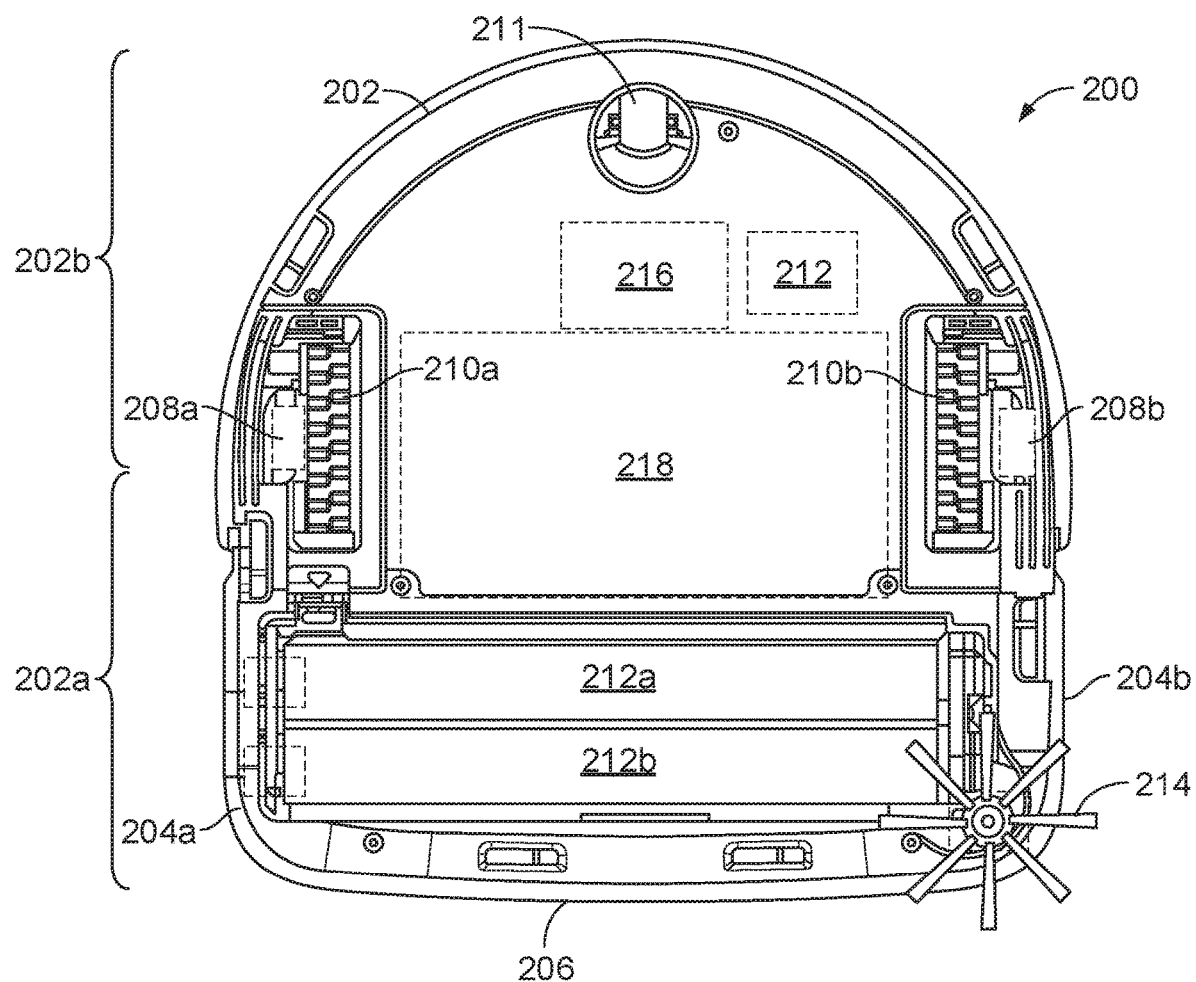
FIG. 2 is a view of an underside of the autonomous cleaning robot of FIG. 1.

Referring to FIG. 2, an autonomous cleaning robot 200 includes a body 202 that is movable across the floor surface 104 and is powered by a battery. The body 202 includes a front portion 202a that has a substantially rectangular shape and a rear portion 202b that has a substantially semicircular shape. The front portion 202a includes, for example, two lateral sides 204a, 204b that are substantially perpendicular to a front side 206 of the front portion 202a.

The autonomous cleaning robot 200 includes a drive system including actuators 208a, 208b operably connected to drive wheels 210a, 210b, which are rotatably mounted to the body 202. The autonomous cleaning robot 200 includes a controller 212 that operates the actuators 208a, 208b to autonomously navigate the autonomous cleaning robot 200 about a floor surface 104 during operation. In some implementations, the autonomous cleaning robot 200 includes a caster wheel 211 that supports the body 202 (e.g. the rear portion 202b of the body 202) above the floor surface 104, and the drive wheels 210a, 210b support the front portion 202a of the body 202 above the floor surface 104.

The vacuum assembly 216 of the autonomous cleaning robot 200 is located in the rear portion 202b of the autonomous cleaning robot 200. The controller 212 operates the vacuum assembly 216 to generate airflow and enable the autonomous cleaning robot 200 to ingest debris 116 during the cleaning operation. In some cases, the autonomous cleaning robot 200 is a self-contained robot that autonomously moves across the floor surface 104 to ingest debris 116. The autonomous cleaning robot 200, for example, carries a battery to power the vacuum assembly 216. In the example in FIGS. 1 and 2, the cleaning head of the autonomous cleaning robot 200 includes a first roller 212a and a second roller 212b. The rollers 212a, 212b include, for example, brushes or flaps that engage the floor surface 104 to collect the debris 116 on the floor surface 104. The rollers 212a, 212b, for example, counter rotate relative to one another to cooperate in moving debris 116 toward a plenum, e.g., one roller rotates counterclockwise while the other rotates clockwise. The plenum in turn guides the airflow containing the debris 116 into a cleaning bin 218. As described herein, during the travel of airflow through the cleaning bin 218 toward the vacuum assembly 216, the debris 116 is deposited in the cleaning bin 218.

In some implementations, to sweep debris 116 toward the rollers 212a, 212b, the autonomous cleaning robot 200 includes a brush 214 that rotates about a non-horizontal axis, e.g., an axis forming an angle between 75 degrees and 90 degrees with the floor surface 104. The brush 214 extends beyond a perimeter of the body 202 such that the brush 214 is capable of engaging debris 116 on portions of the floor surface 104 that the rollers 212a, 212b typically cannot reach. In particular, the brush 214 is capable of engaging debris 116 near walls of the environment and brushing the debris 116 toward the rollers 212a, 212b to facilitate ingestion of the debris 116 by the autonomous cleaning robot 200.

Figure 3:
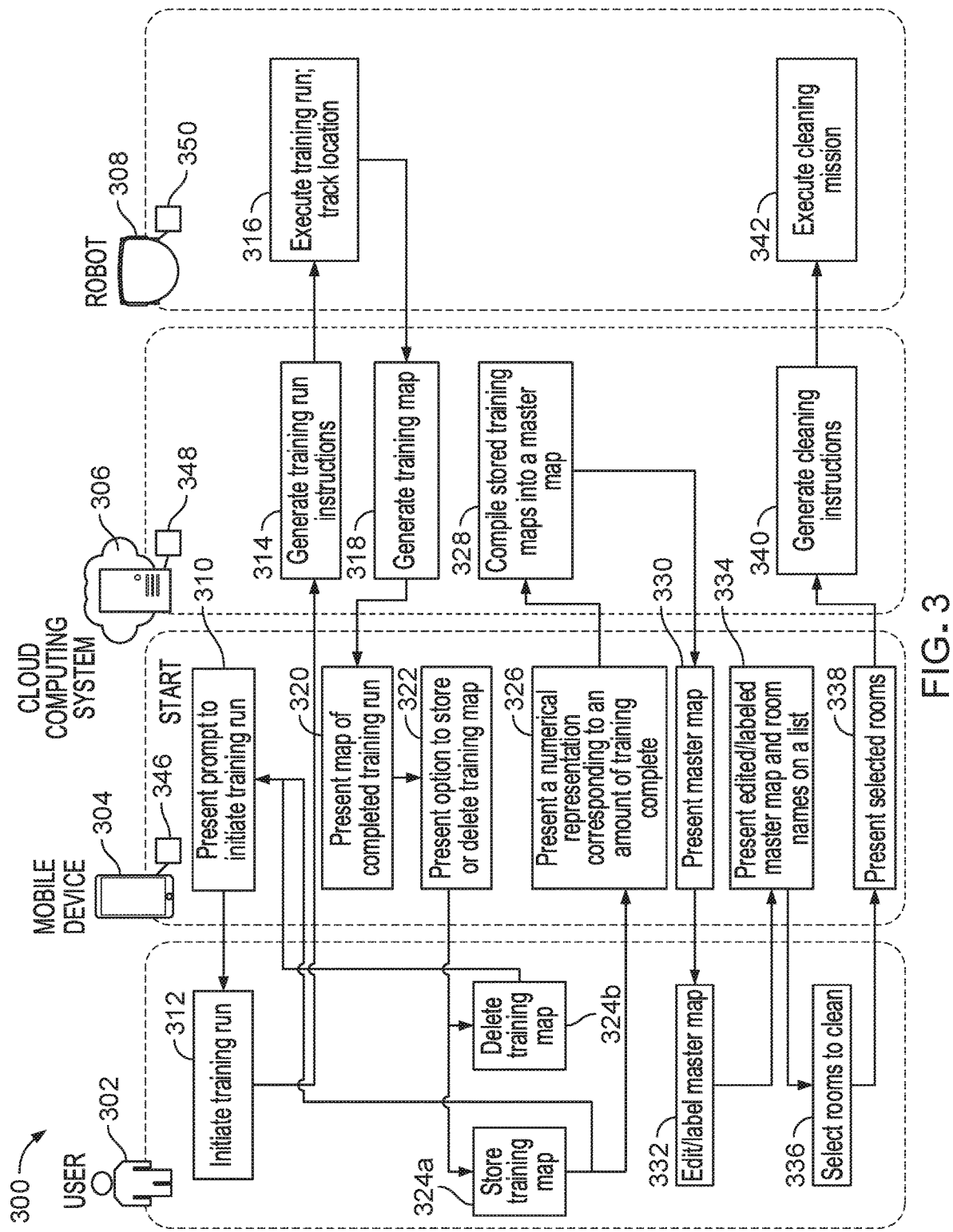
FIG. 3 is a flow chart depicting a process for transmitting data among a mobile device, a cloud computing system, and the autonomous cleaning robot of FIG. 1.

Referring to FIG. 3, an autonomous cleaning robot 308 (similar to the autonomous cleaning robot 200 in FIG. 2) is configured to exchange information with a mobile device 304 and a cloud computing system 306 to perform training missions. A cloud computing system 306 as described herein is a computing system external to the mobile device and to the autonomous cleaning robot 308 that provides computing processing resources as required within the training and control system. The cloud computing system 306 is configured to receive and transmit signals between the mobile device 120 and the processor 350 of the autonomous cleaning robot and is configured to process data received from either the mobile device 120 or the processor 350 of the autonomous cleaning robot 308. The mobile device 304 includes a processor 346 (similar to processor 114 of mobile device 120 in FIG. 1) configured to present, on a display of the mobile device 304, a prompt to initiate a training run.

The mobile device 304 presents (310), on the display, an option to initiate a training run. When a user 302 selects (312) this option, the mobile device 304 sends an instruction to initiate a training run. The cloud computing system 306 generates (314) instructions for the training run and sends the instructions to the autonomous cleaning robot 308. The cloud computing system 306 is configured to receive and transmit signals between the mobile device 304 and a processor 350 of the autonomous cleaning robot 308 and is configured to process data received from either the mobile device 304 or the processor 350 of the autonomous cleaning robot 308. The autonomous cleaning robot 308 executes (316) the training run and tracks locations that the autonomous cleaning robot 308 traverses. The location information is typically transmitted from the autonomous cleaning robot 308 to another location (e.g., the cloud computing system 306, the mobile device 304) for analysis.

Based on the locations tracked during execution of the training run, the cloud computing system 306 generates (318) a training map. The training map shows locations in an area traversed by the autonomous cleaning robot 308 during a training run. In one arrangement, shaded areas on the training map correspond to areas traversed by the autonomous cleaning robot 308 during the training run. The training map generated by the cloud computing system 306 is presented (320) on the mobile device 304. The mobile device 304 also presents (322) an option to store or delete the training map (e.g., options for storing or deleting the training map are presented in a selectable graphic).

The user 302 inspects the training map presented on the mobile device 304 and decides whether to store (324a) or to delete (324b) the presented training map. The user 302 may consider whether the training map generated by the cloud computing system 306 is representative of the area in which the autonomous cleaning robot 308 was operating during the training run. For example, if a portion of the area was blocked (e.g., by furniture, a closed door, another obstacle, etc.) during the training run, the autonomous cleaning robot may not have been able to access the blocked portion of the area. Therefore, the training map may not be representative of the entire area. In such an instance, a user may choose to delete the training map. When a training map is deleted, it is not used during generation of the master map. Therefore, abnormal operations, layouts, etc. identified by the user 302 are not captured in the master map.

Depending on the selection of user 302 to store or delete the training map, the mobile device presents different selectable options. If the user 302 deletes (324b) the training map presented on the mobile device 304, the mobile device 304 returns to a starting interface and presents (310) a prompt to initiate a training run. If the user 302 stores (324a) the training map presented on the mobile device 304, the mobile device presents (326) a numerical representation corresponding to an amount of training that has been completed by the autonomous cleaning robot 308. The numerical representation may be, for example, a number corresponding to a number of stored training maps or a percentage corresponding to a number of completed and stored training maps versus a number of training maps used to generate the master map.

After the user 302 decides to store (324a) the training map, the cloud computing system 306 compiles (328) all stored training maps into a master map. If enough training maps have been stored to generate a master map, the master map is then presented (330) on the mobile device 304 for customization (e.g., editing, labeling, etc.). In some instances, a master map may not be generated until a certain number of training maps have been stored, e.g., three, five, eight, ten, etc. In some instances, the mobile device 304 presents an indication that more training maps need to be stored before a master map may be generated.

The cloud computing system 306 may analyze the master map and identify areas on the master map as individual rooms. The cloud computing system 306 may perform this identification based on room shape or other data gathered by the autonomous cleaning robot 308. For example, the autonomous cleaning robot 308 may include other sensors (e.g., an inertial measurement unit (IMU), a gyroscope, cliff sensors, etc.) that gather data during training runs. In one example, the autonomous cleaning robot 308 may cross a threshold when traversing between rooms that can be detected via a gyroscope or IMU as a change in vertical height or pitch. Based on a detection of a threshold, one or more rooms may be identified.

The user 302 is able to edit (332) the master map to adjust a layout of the master map (e.g., by splitting portions of the master map into rooms, merging portions of the master map into rooms, etc.). For example, the cloud computing system 306 may identify a portion of the master map as one room, but the user may identify that portion as two separate rooms. In such an instance, the user may split the portion of the master map into two separate rooms. The user 302 may also label rooms on the master map with names, e.g., "Kitchen", "Master Bedroom", "Family Room", etc. In some instances, the names may be chosen from a preset list. In other instances, the names may be custom names assigned by the user 302. The mobile device 304 presents (334) an edited and labeled master map and a list of rooms generated based on the room labels on the master map.

From the list of rooms, the user 302 can select (336) rooms to include in a cleaning mission. The mobile device 304 presents (338) the selected rooms on the display, for example, by highlighting (e.g., changing the color of the room label text, marking a checkbox) the selected room. The cloud computing system 306 generates (340), via a processor 348, cleaning instructions for cleaning the selected rooms during the cleaning mission. The cleaning instructions may include specific cleaning parameters (e.g., a vacuum power setting, a mopping setting, edge cleaning, spot cleaning, etc.) to be used in selected rooms. The autonomous cleaning robot 308 receives the cleaning instructions generated by the cloud computing system 306 and a processor 350 of the autonomous cleaning robot 308 executes (342) the cleaning mission based on the cleaning instructions. During the cleaning mission, only the selected rooms are cleaned by the autonomous cleaning robot 308. Therefore, efficient cleaning of the desired rooms may be accomplished.

Figure 4B:
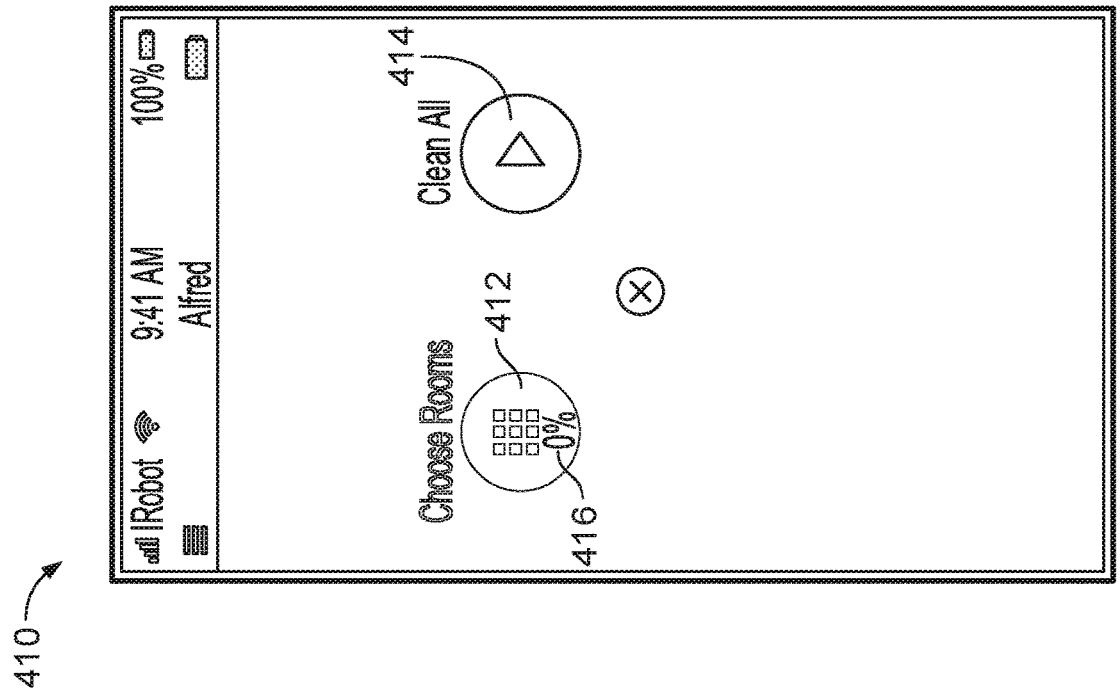
Figure 4A:
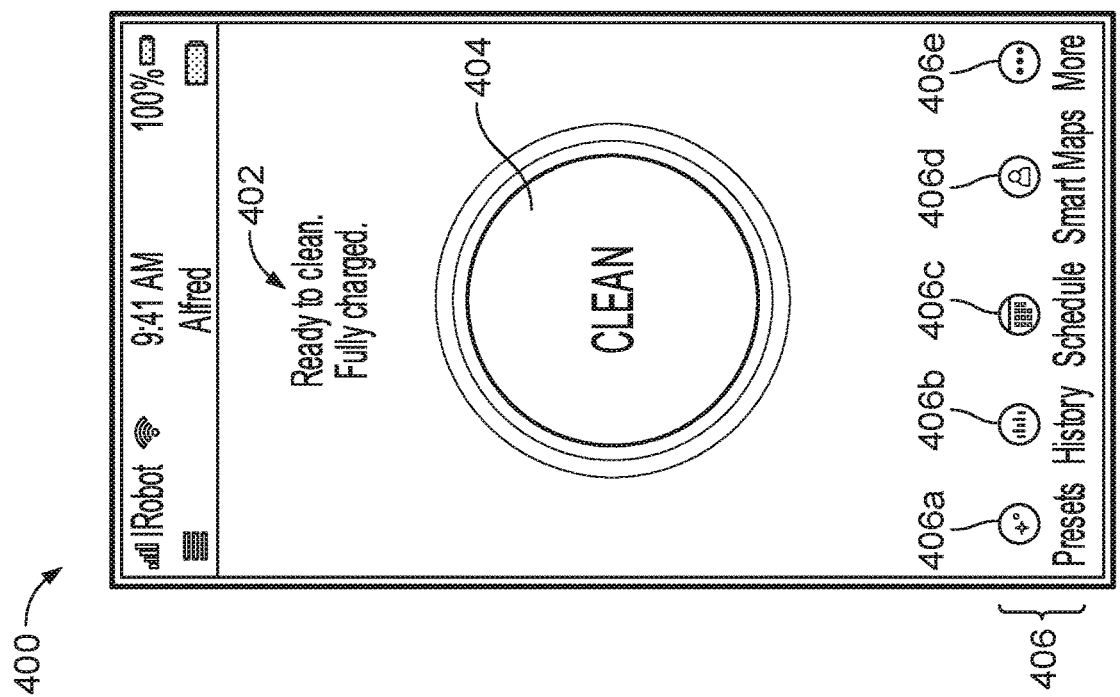

FIGS. 4A-4J are interfaces of a mobile application executed by the processor 346 on the mobile device 304 and configured to initiate and evaluate the performance of the autonomous cleaning robot 308 during a training run. Referring to FIG. 4A, an interface 400 presents, on the display of the mobile device 304, a status message 402 of the user's autonomous cleaning robot (here, named "Alfred"). The interface 400 also presents a clean button 404 configured to, when selected, initiate a cleaning mission. The interface 400 also presents an icon array 406. The icon array 406 includes five icons 406a, 406b, 406c, 406d, 406e that allow a user 302 to navigate to other portions of the mobile application. For example, the user 302 can navigate to icons representing presets (e.g., cleaning settings, other preferences), history (e.g., past training missions, past cleaning runs), scheduling, and mapping portions of the mobile application. Selecting icon 406e allows the user 302 to access more aspects of the mobile application. Selecting the mapping icon 406d opens an interface 410, shown in FIG. 4B.

The interface 410 presents a choose rooms icon 412 and a clean all icon 414. The choose rooms icon 412 includes a numerical value that represents a percentage 416 corresponding to a number of stored training maps in relation to a total number of stored training maps used to generate the master map (e.g., a percentage of sixty percent can correspond to three training maps stored in relation to five training maps used to generate the master map). In some implementations, other information may be represented by a numerical value. For example, an interface may present a raw number representing a number of stored training runs rather than a percentage. The master map, once complete, enables users to choose particular rooms to be cleaned during cleaning missions. Interface 410 reports that 0% of the required stored training maps have been stored by the user. If the percentage 416 on the choose rooms icon 412 is less than 100%, the choose rooms icon 412 is not selectable (e.g., visually greyed out). Instead, the user 302 may select the clean all icon 414 to send instructions to the autonomous cleaning robot 308 to clean all areas in the space. In such an instance, the autonomous cleaning robot 308 tracks its location during the cleaning mission. In some instances, the tracked locations may be presented on a map for review by the user 302, similar to the process for training maps discussed with respect to FIG. 3.

Figure 4D:
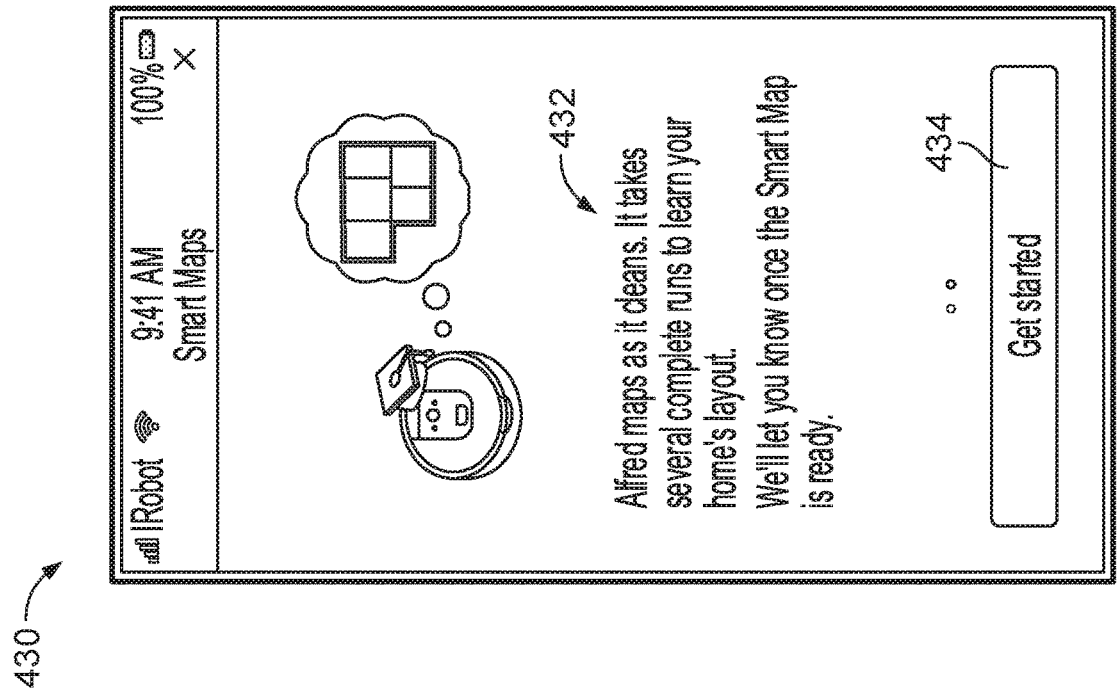
Figure 4C:
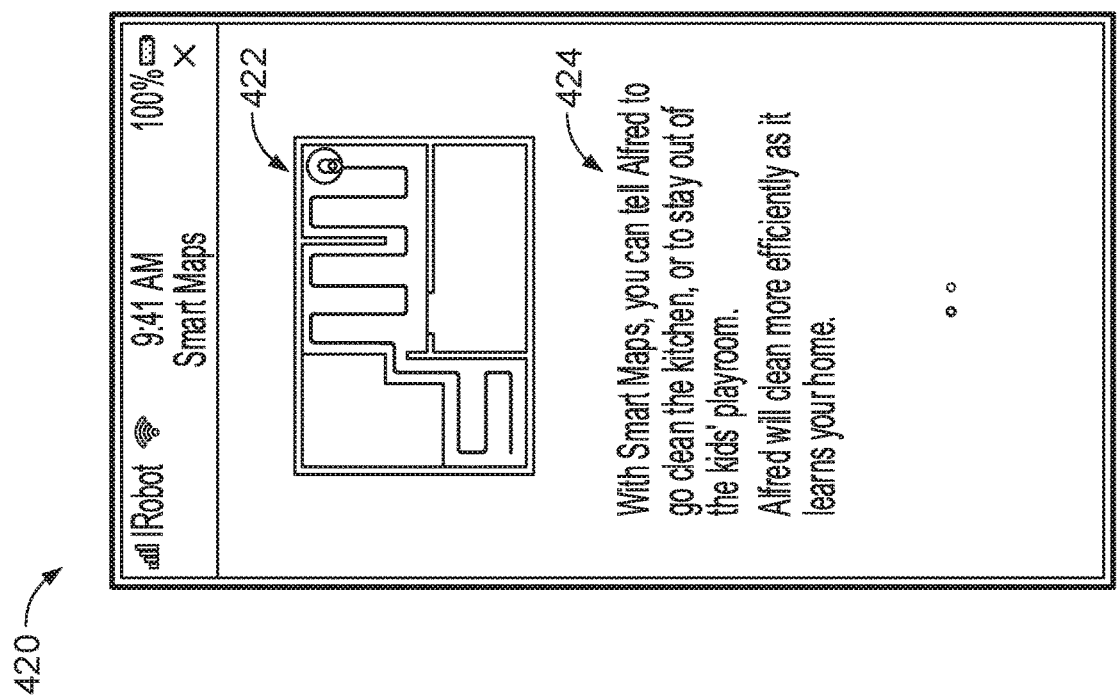
Figure 41:
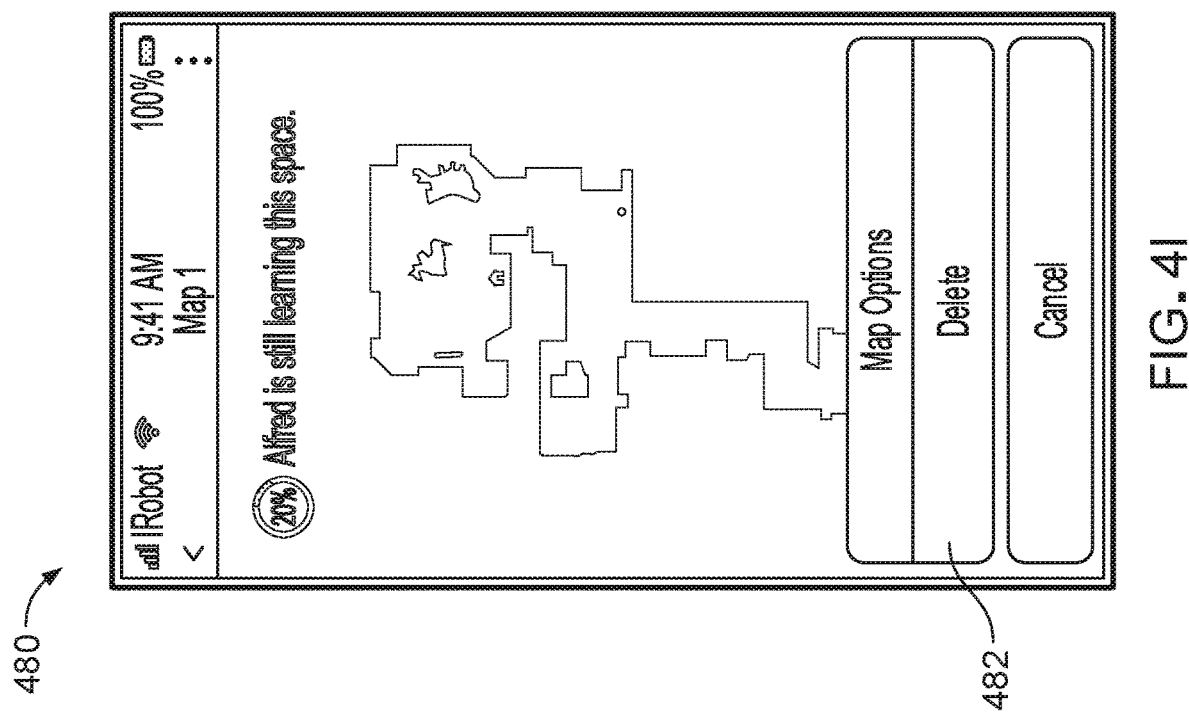

FIGS. 4C, 4D, and 4E show interfaces that provide instructions and information to a user for setting up for a training run and generating a master map. FIG. 4C shows an interface 420 that includes text 424 informing the user 302 of the advantages of generating a master map. Interface 420 also includes an image 422 showing that particular rooms may be cleaned by the autonomous cleaning robot 308 while others are avoided (e.g., for more efficient, targeted cleaning). Interface 430, shown in FIG. 4D, explains in text 432 that the autonomous cleaning robot 308 maps as it cleans and that multiple runs will be necessary to learn the layout of the user's space. Interface 430 also allows the user to select a get started button 434 to proceed to further setup. Interface 440, shown in FIG. 4E, presents a list of instructions 442 to the user 302 for preparing his/her space to be traversed and mapped by the autonomous cleaning robot 308 during a training run. The interface 440 also includes a start training button 444 and a skip button 446. The skip button 446 allows the user 302 to proceed directly to performing a cleaning mission, bypassing performing training runs. The autonomous cleaning robot 308 will then learn and map the layout of the space during cleaning missions.

During a training run, a status indicator 452 of the autonomous cleaning robot 308 is presented on interface 450 as shown in FIG. 4F. The interface 450 also includes an icon array 456 including five icons 456a, 456b, 456c, 456d, 456e that allow the user 302 to navigate to other portions of the mobile application, as discussed above with respect to FIG. 4A. The interface 450 includes a clean button 454 allowing the user 302 to instruct the autonomous cleaning robot 308 to begin a cleaning mission. Selecting the cleaning button 454 may interrupt the training run. In some implementations, the autonomous cleaning robot 308 may continue location tracking during the cleaning mission. Location information generated during a training run portion and location information generated during a cleaning run portion of the mission may both be used to generate a map presented to the user 302 for review.

Multiple master maps may be generated and stored by the mobile application. FIG. 4G shows an interface 460 that includes a list 462 of master maps that have been or are in the process of being created. In this example, interface 460 includes a label 464 corresponding to Map 1. The label 464 includes a status identifier 466 that reports the status of Map 1 as "Still learning". The interface 460 also includes a completeness icon 468 that graphically represents the completeness of Map 1 based on a stored number of training maps in relation to a number of stored training maps required to generate the master map.

By selecting the label 464 corresponding to a master map (e.g., Map 1), interface 470 shown in FIG. 4H is presented and a training map 476 generated during a training run is presented. A status message 472 and a completeness icon 474 of a master map of the space are also presented. The completeness icon 474 graphically represents a number of training maps stored in relation to a number of stored training maps used to generate the master map. An add training run button 478 at the bottom of the interface 470 allows the user 302 to begin another training run. The user 302 selects the map 476 and an interface 480 is presented. Interface 480, as shown in FIG. 4I, allows the user 302 to delete the training map 476 by pressing delete button 482.

In some instances, a training map may not be representative of the area in which the autonomous cleaning robot 308 is operating. For example, the robot may have not been able to access a portion of the area because the portion of the area was blocked (e.g., by a closed door, by a large piece of furniture, by another obstacle, etc.) during the training run. The user 302 may not want to store a training map generated during such a training run because the training map is missing some location data due to the blocked off portion of the area. In the interfaces shown in FIGS. 4H-4I, the training map 476 is stored by the mobile device 304 unless it is actively deleted by the user 302 using delete button 482. In some implementations, the user 302 may be presented with an option to store the training map and the option must be selected in order to store the map.

Figure 5B:
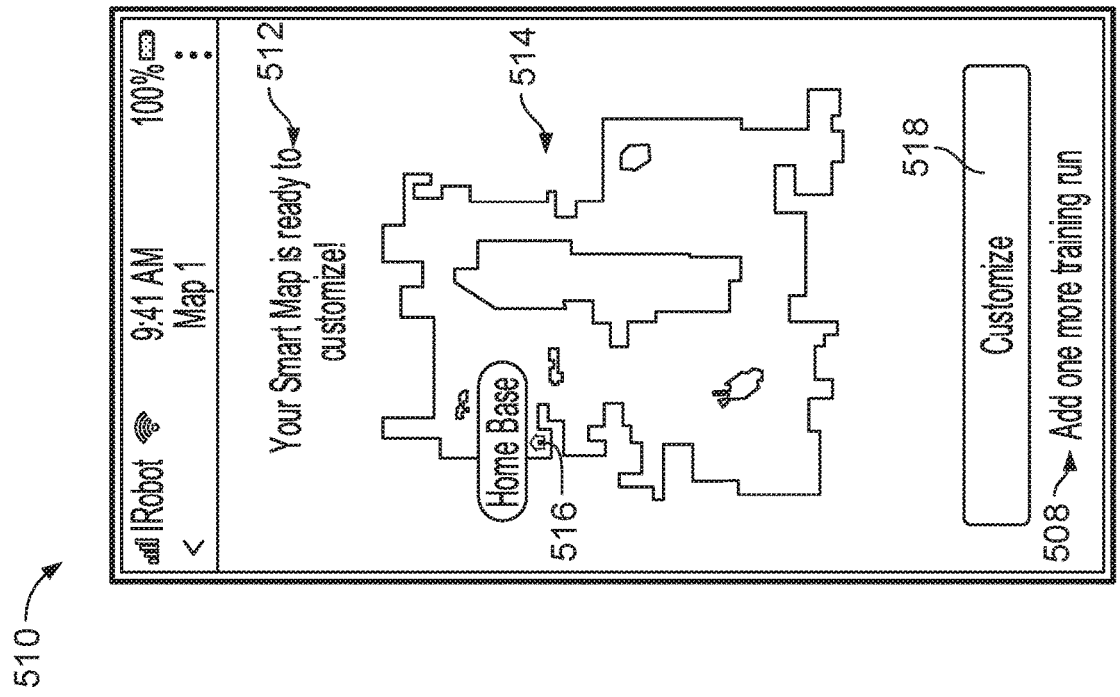
FIGS. 5A-5J are interfaces of a mobile application for viewing and editing a master map.
Figure 5A:
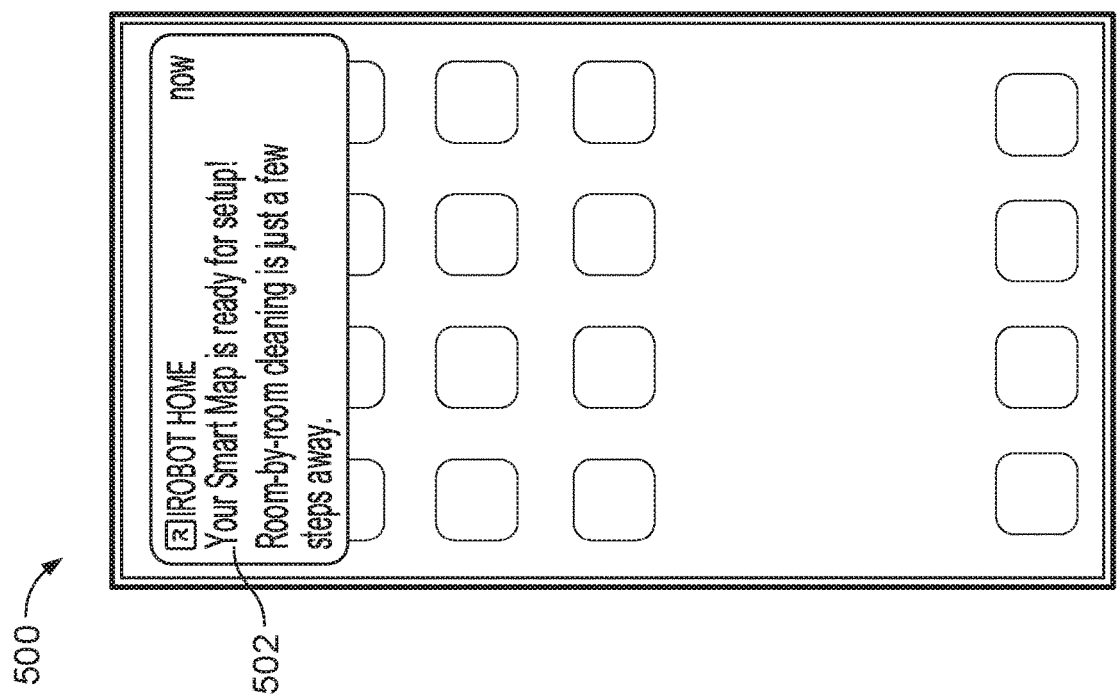

Referring to FIG. 5A, a push notification 502 on interface 500 indicates to a user that a master map has been generated and is ready for setup. Selecting the push notification 502 on the display of the mobile device 304 presents interface 510, shown in FIG. 5B, on the display of the mobile device 304. Interface 510 includes a master map 514 compiled from stored training maps produced during training runs and stored by the user. The master map 514 includes an icon 516 that indicates a location of a docking station. The interface 510 also includes a status summary message 512 indicating to the user 302 that the master map 514 is ready for customization (e.g., editing, labelling, etc.). The interface 510 also includes an add training run button 508 allowing a user 302 to initiate another training run. Additional training runs can be reviewed by the user 302, and if stored by the user 302, included in the set of training maps used to generate the master map. The user 302 may also select a customize button 518 which allows the user 302 to edit the master map 514 as shown in FIGS. 5B-5J.

Figure 5D:
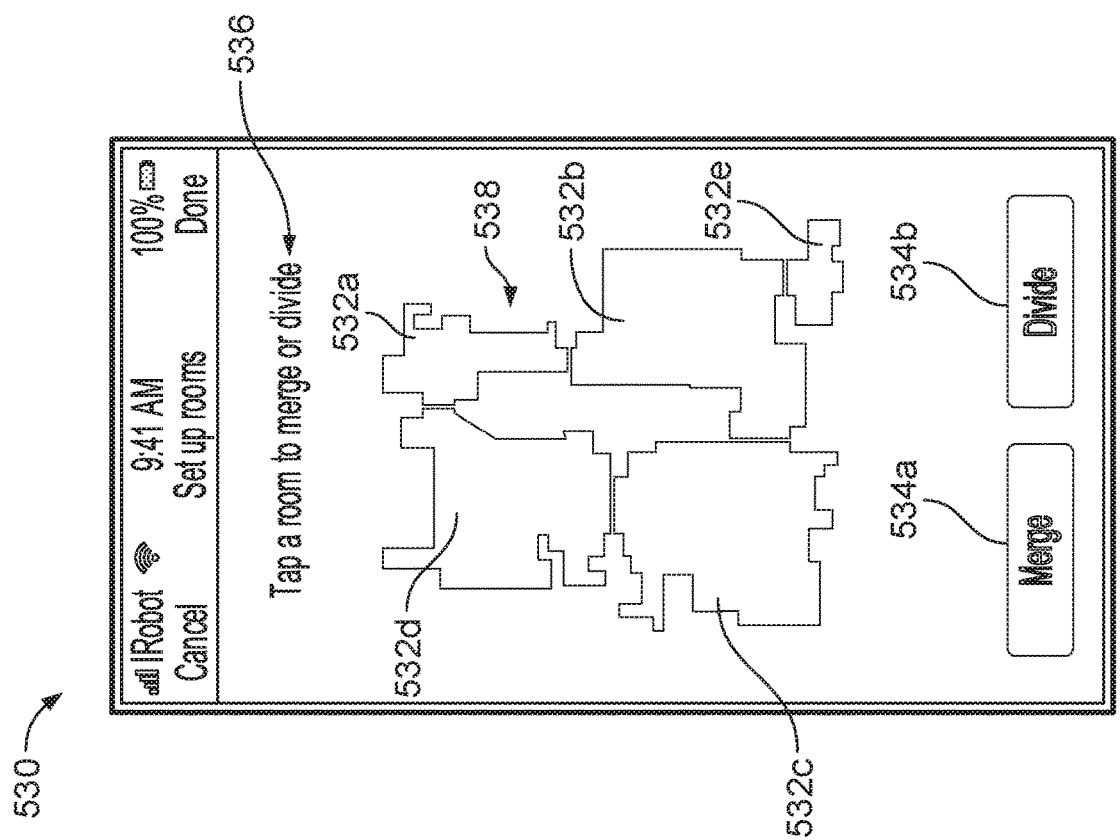
Figure 5C:
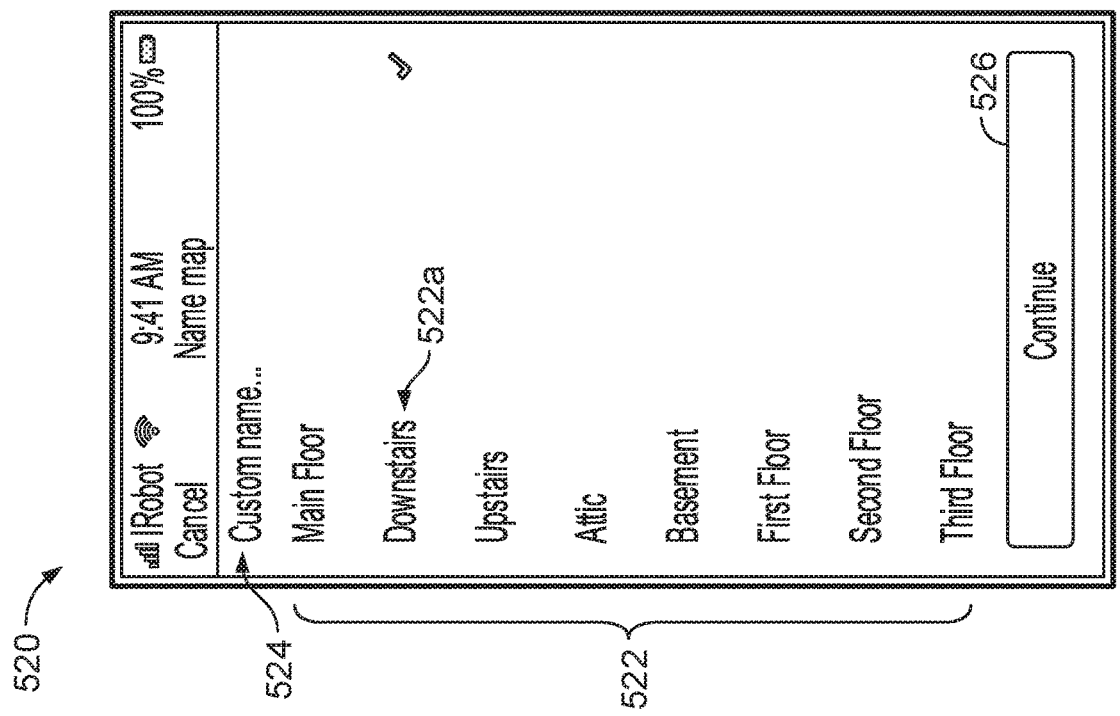

When the user selects the customize button 518 shown in FIG. 5B, the mobile device 304 presents interface 520, shown in FIG. 5C, to begin customization. The user 302 can name the master map by entering a custom name in the custom name field 524 or selecting from a list 522 of preset names. The preset name list 522 includes common names for rooms or floor levels of homes (e.g., "Downstairs" label 522a). After a name has been selected or entered, the user 302 selects a continue button 526.

Figure 5F:
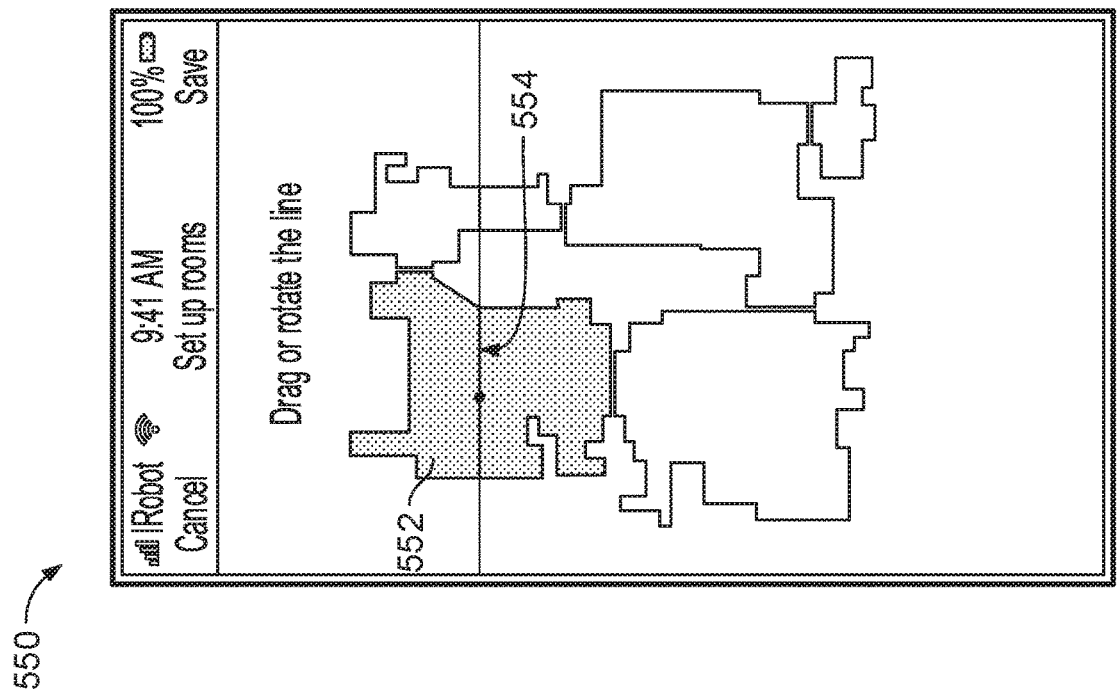
Figure 5E:
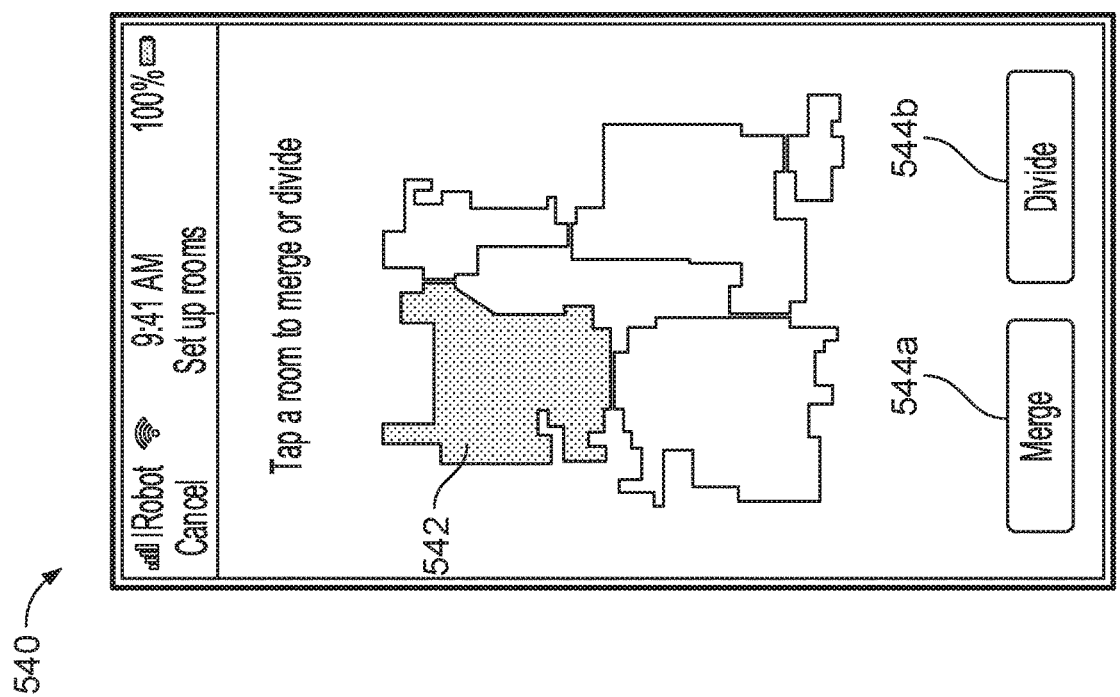

After the master map has been named, the user 302 may customize the master map on a room by room basis. In FIG. 5D, the mobile device 304 presents an interface 530 that includes instructions 536 to the user 302 to select a room on the master map 538 to merge the room or divide the room. The master map 538 includes boundaries between areas that have been identified as rooms based on the location data and/or other data gathered by the autonomous cleaning robot 308. For example, in the master map 538 presented on interface 530, five rooms 532a, 532b, 532c, 532d, 532e have been identified. Until the user 302 selects one of the rooms presented on the master map 538, merge and divide buttons 534a and 534b are unselectable (e.g., visually greyed out). When the user 302 selects a room on the master map 538, such as room 542 shown in FIG. 5E, the room 542 changes color (as represented by the darker shade in the figure) and merge and divide buttons 544a and 544b change color and become selectable (e.g., change from greyed out to another color). By selecting the divide button 544b, as shown in FIG. 5F, a dividing bar 554 appears in a selected room 552. The dividing bar 554 can be moved and rotated to allow the user 302 to divide the selected room 552 as desired. Changes made to the master map 538 by the user 302 are stored.

Figure 5H:
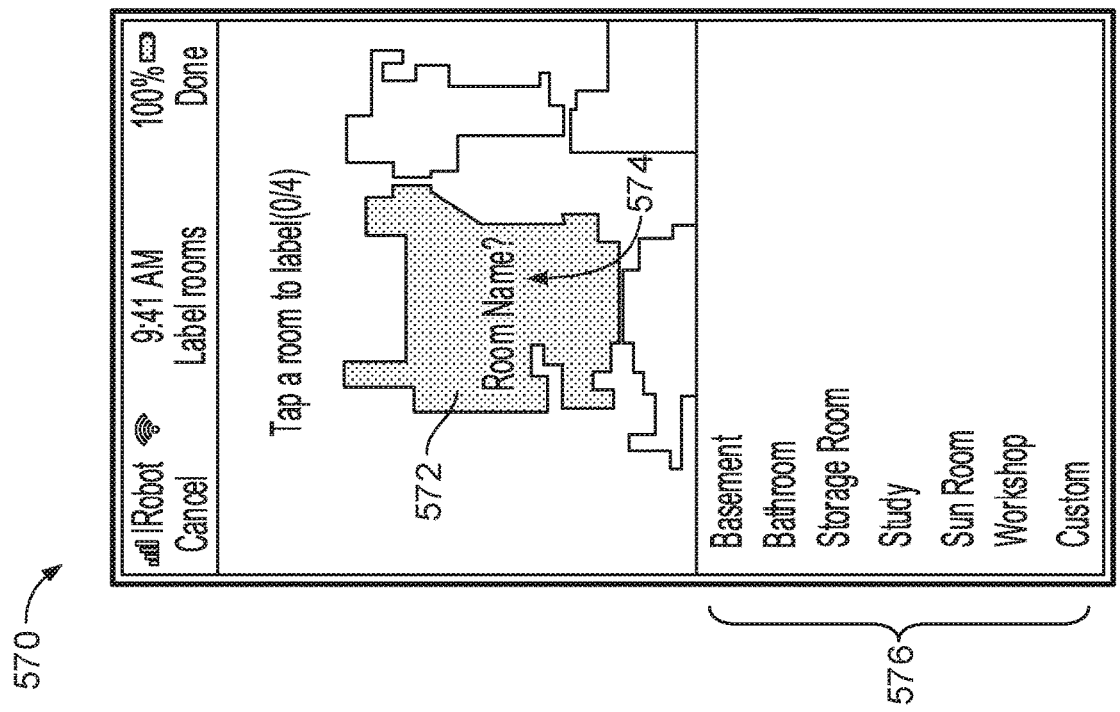
Figure 5G:
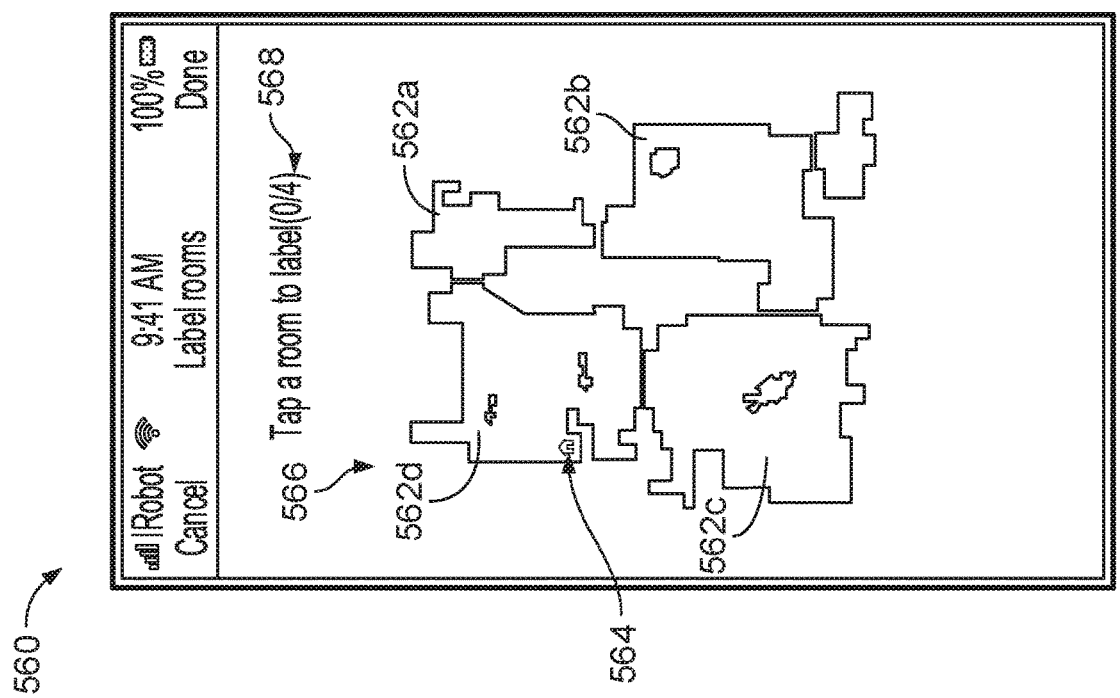
Figure 5J:
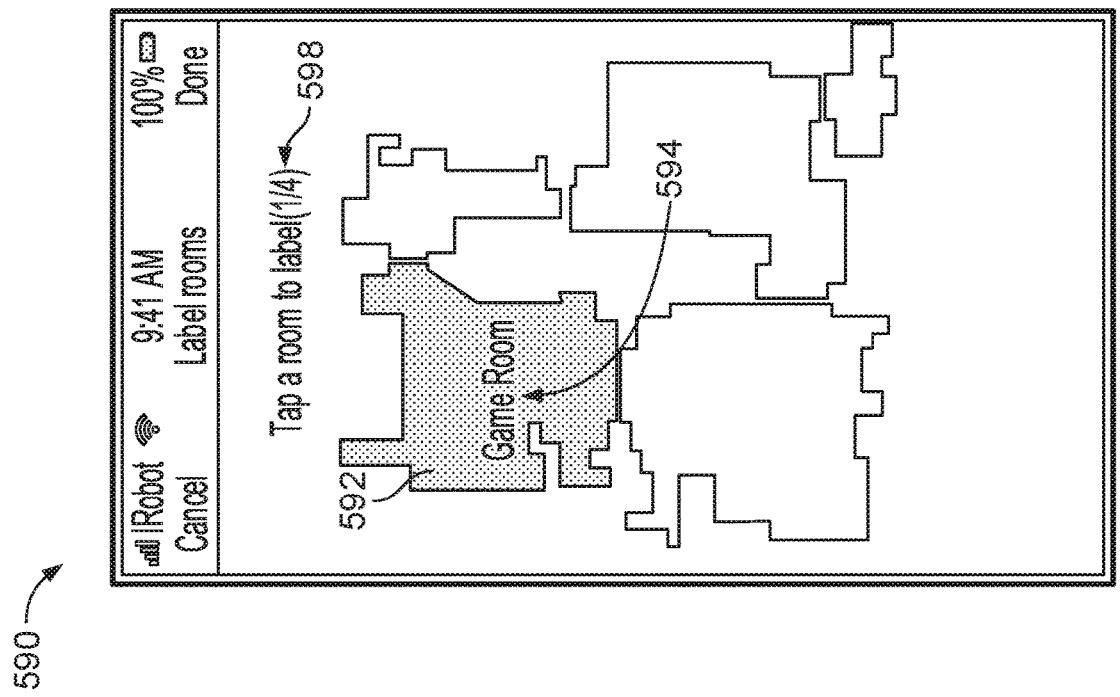
Figure 5I:
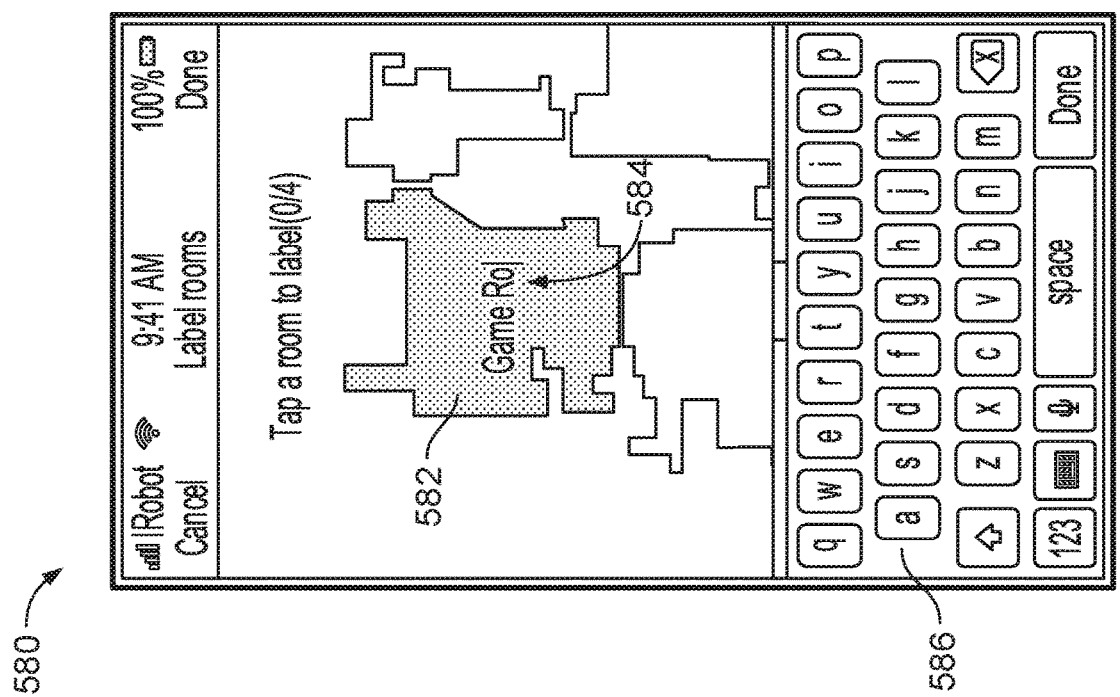

Once the room layout has been completed, individual rooms can be labelled. In FIG. 5G, an interface 560 presents a master map 566 including rooms 562a, 562b, 562c, 562d. The interface 560 includes an instruction message 568 to a user to label the rooms. An icon 564 showing a location of a docking station on the master map 566 is also included on the interface 560. When the user 302 selects a room 572 (corresponding to unselected room 562d in interface 560), as is shown in FIG. 5H, the room 572 changes color and text 574 is positioned on the room 572. In interface 570, user 302 selects a room name from a list 576. Alternatively, in an interface 580 shown in FIG. 5I, the user 302 enters a custom name 584 for room 582 using a graphical keyboard 586. Interface 590 shown in FIG. 5J, includes a label 594 on the room 592. Additionally, header text 598 is updated to show that one out of four rooms has been labeled.

Figure 6B:
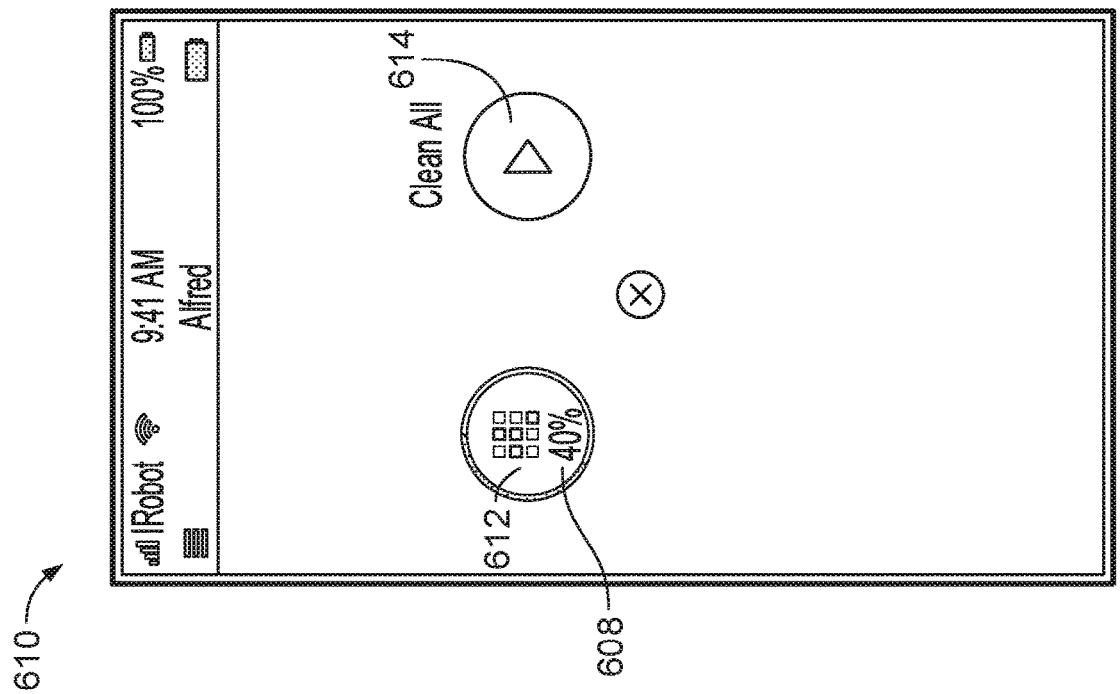
Figure 6A:
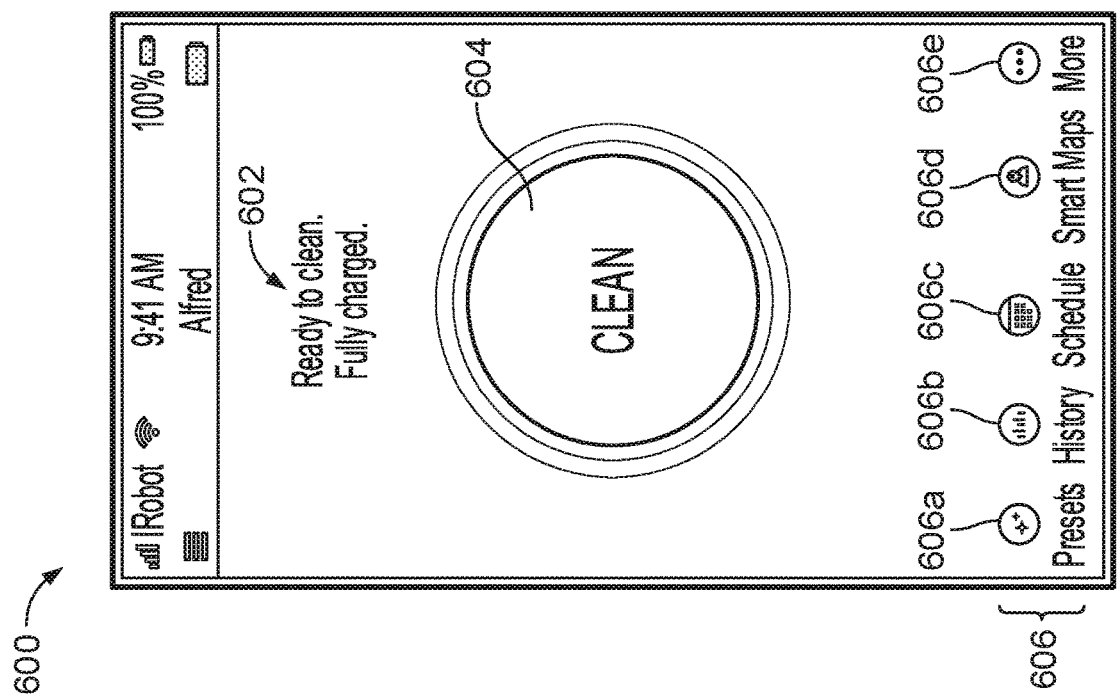

FIGS. 6A-6H show interfaces of a mobile application configured to allow the user 302 to select areas (e.g., rooms, floors, etc.) to be cleaned by the autonomous cleaning robot 308 from a master map. Referring to FIG. 6A, an interface 600 presents, on the display of the mobile device 304, a status message 602 of the autonomous cleaning robot 308. The interface 600 also presents a clean button 604 and an icon array 606. The icon array includes five icons 606a, 606b, 606c, 606d, 606e allowing a user to navigate to other portions of the mobile application, as discussed above with respect to FIG. 4A. Selecting icon 606e allows the user 302 to access more aspects of the mobile application.

Selecting mapping icon 606d opens an interface 610, shown in FIG. 6B that presents a choose rooms icon 612 and a clean all icon 614. The choose rooms icon 612 includes a numerical value that represents a percentage 608 corresponding to a number of stored training maps in relation to a total number of stored training maps used to generate the master map. Percentage 608 reports that 40% of the stored training maps used to generate the master map have been stored by the user 302. If the percentage 608 on the choose rooms icon is less than 100%, the choose rooms icon 612 is not selectable (e.g., is visually greyed out). Instead, the user 302 may select the clean all icon 614. When the clean all icon 614 is selected, the mobile device 304 sends instructions to the autonomous cleaning robot 308 to begin a cleaning mission for cleaning all areas in the space.

Figure 6D:
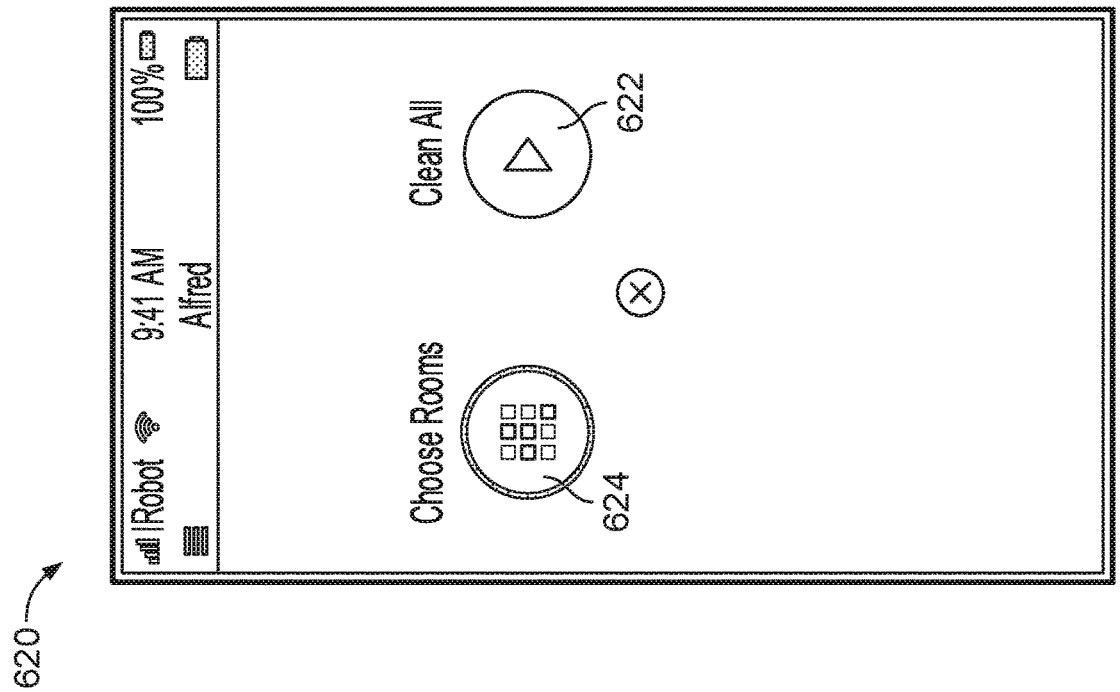
Figure 6C:
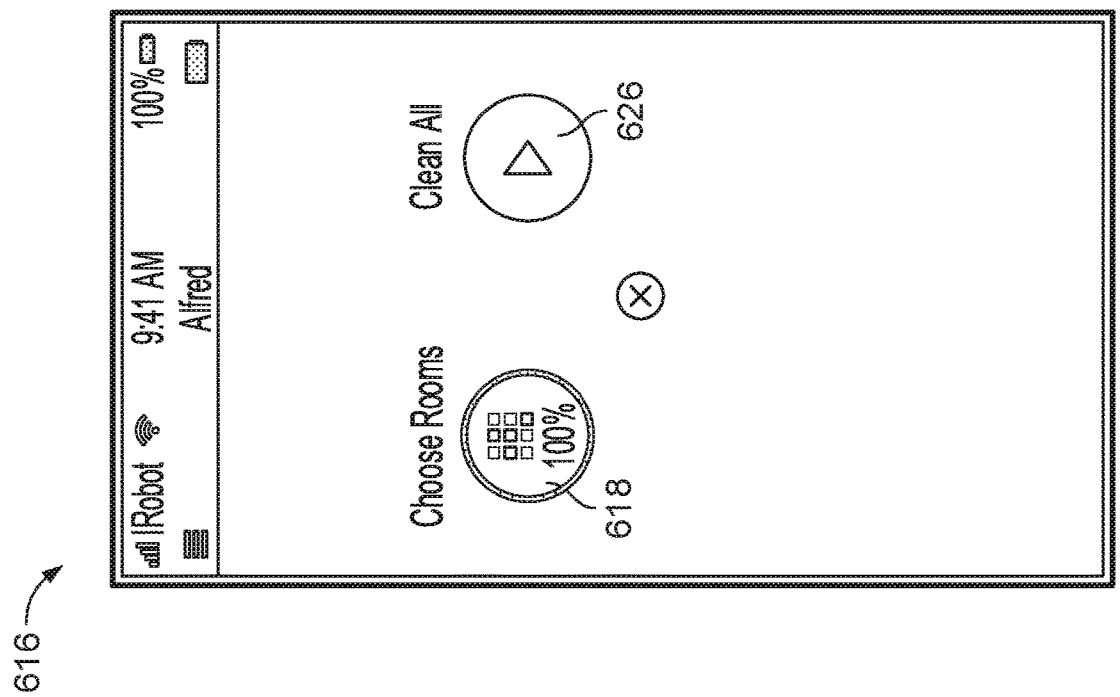

If a master map has been generated, but not customized, interface 616 shown in FIG. 6C is presented. Interface 616 includes a choose rooms button 618 reporting that 100% of the stored training maps used to build a master map have been stored by the user 302. However, the choose rooms button 618 indicates (as shown by being a different color than clean all button 626) that some setup is still required by the user 302 before room selection based cleaning missions can be performed. For example, the master map may need to be customized as shown in FIGS. 5A-5J before proceeding.

In FIG. 6D, an interface 620 shows a choose rooms button 624 that has changed color to match a clean all button 622, indicating that the master map is complete and the choose rooms feature is available for initiating room selection based cleaning missions. Selecting the choose rooms button 624 presents interface 630, shown in FIG. 6E, that includes a list of rooms 636. The list of rooms 636 is labelled with a list name 632 and a list composition label 634. The list name 632 corresponds to a title of a master map including the rooms in the list 636. The list composition label 634 shows the number of rooms included on the list 636. The list of rooms 636 includes room names corresponding to room labels (e.g., label 594 shown in FIG. 5J) included on the corresponding master map. The list 636 also includes an icon 638 indicating a location of a docking station. The list 636 also includes checkboxes 664 indicating that the rooms on the list 636 are selectable for inclusion in a cleaning mission. Until at least one room is selected from the list 636, a start cleaning button 648 is unselectable (e.g., visually greyed out).

Figure 6F:
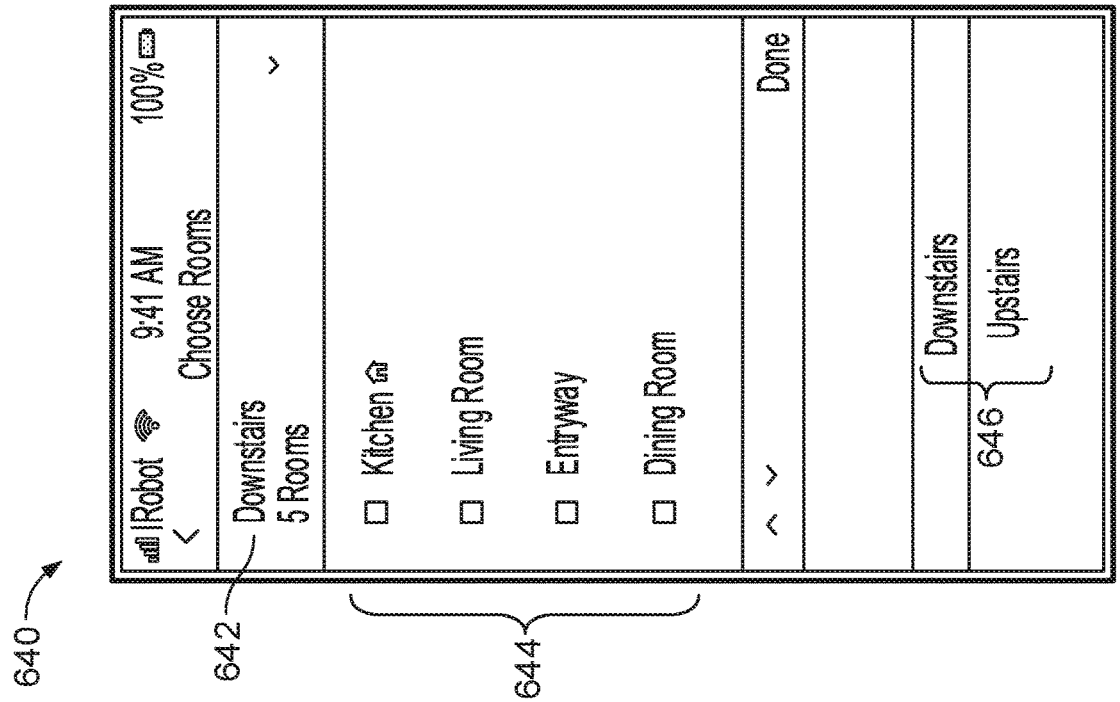
Figure 6E:
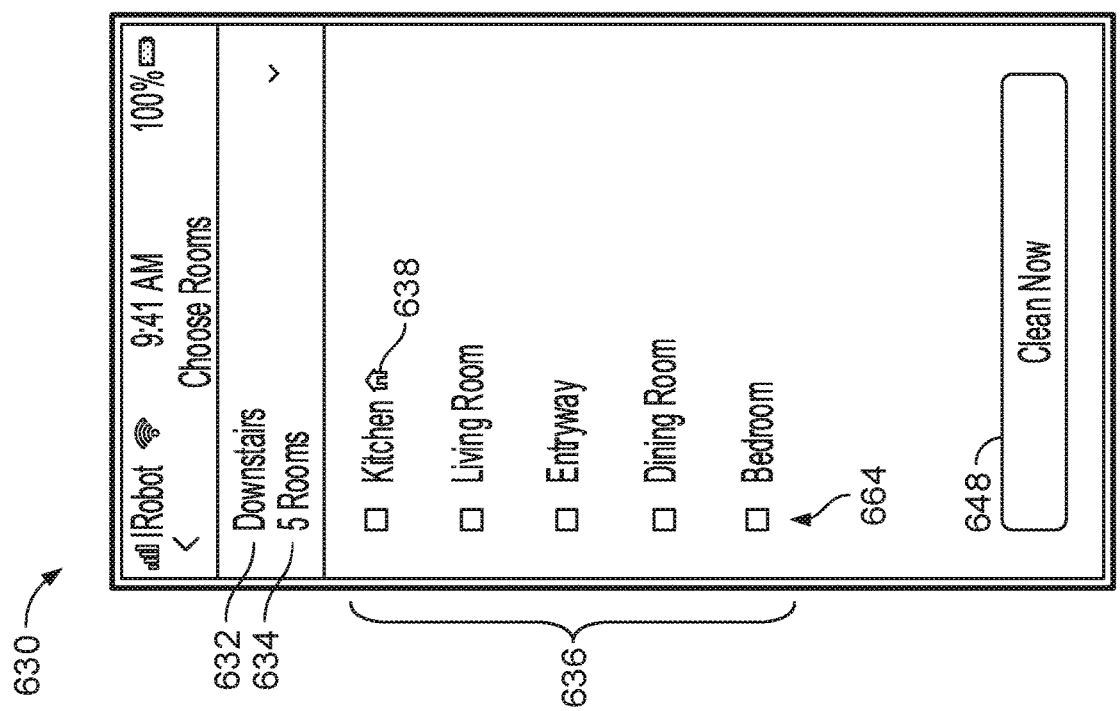

Multiple master maps may be created for different spaces in a home. For example, for a home with two floors, a master map may be created for a downstairs space and another for an upstairs space. FIG. 6F shows an interface 640 that allows the user 302 to switch between multiple master maps. For example, when "Downstairs" is selected from list 646, the list name 642 and a list of rooms 644 will correspond to a "Downstairs" master map. When "Upstairs" is selected, the list name 642 and list of rooms 644 will change to match an "Upstairs" master map.

Referring to FIG. 6G, after choosing a list 654 corresponding to a master map, the user 302 can select individual rooms for cleaning from the list 654. On interface 650, three rooms have been selected from the list of rooms 654. When rooms are selected from the list 654, a corresponding checkbox 656 is marked and the room name changes color. Additionally, an indicator 652 is presented on the right side of the interface for each selected room to indicate that the user 302 may reorder the rooms in the list 654. The rooms are cleaned by the autonomous cleaning robot 308 in the order presented on the list 654. For example, if the user 302 wants the autonomous cleaning robot 308 to clean the kitchen after the living room and the dining room, the user 302 drags the "Kitchen" label below the "Dining Room" label using the indicator 652. After selecting rooms for cleaning in the cleaning mission, the user 302 selects a clean now button 658 to clean the selected rooms. Upon the user 302 selecting the clean now button 658, the mobile device 304 sends a signal for the autonomous cleaning robot 308 to clean the selected rooms. If the autonomous cleaning robot 308 is offline, an error message 662 is presented on an interface 660, shown in FIG. 6H. The error message 662 indicates that communication between the mobile device 304 and the autonomous cleaning robot 308 has failed.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

Operations associated with implementing all or part of the robot training and control described herein can be performed by one or more programmable processors executing one or more computer programs to perform the functions described herein. For example, the mobile device, the cloud computing system, and the robot's controller may all include processors programmed with computer programs for executing functions such as transmitting signals, computing estimates, or interpreting signals. A computer program can be written in any form of programming language, including compiled or interpreted languages, and it can be deployed in any form, including as a stand-alone program or as a module, component, subroutine, or other unit suitable for use in a computing environment.

The controllers and mobile devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The robot control and training techniques described herein may be applicable to controlling other mobile robots aside from cleaning robots. For example, a lawn mowing robot or a space-monitoring robot may be trained to perform operations in specific portions of a lawn or space as described herein. A user could similarly monitor and/or manipulate the mission progress of these robots through a mission timeline and/or mapping interface presented on a mobile device.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

What is claimed is:

1. A method of operating an autonomous cleaning robot, the method comprising:
   initiating a training run of the autonomous cleaning robot;
   receiving, at a mobile device, location data from the autonomous cleaning robot as the autonomous cleaning robot navigates an area;
   presenting, on a display of the mobile device, a training map depicting portions of the area traversed by the autonomous cleaning robot during the training run;
   presenting, on the display of the mobile device, an interface configured to provide (i) a first option to allow storage of the entire training map depicting the portions of the area that were traversed by the autonomous cleaning robot during the training run and (ii) a second option to allow deletion of the entire training map depicting the portions of the area that were traversed by the autonomous cleaning robot during the training run;
   storing the entire training map in response to a selection of the first option by a user;

initiating additional training runs to produce additional training maps;

storing one or more of the additional training maps in response to a user indication to store each of the one or more additional training maps; and presenting a master map generated based on the stored training maps.

2. The method of claim 1, further comprising, presenting, on the display of the mobile device, a numerical value representing the stored training maps or a percentage of stored training maps relative to a number of training maps used to generate the master map.

3. The method of claim 1, further comprising, merging portions of the master map to identify a portion of the master map as a room.

4. The method of claim 1, further comprising, splitting portions of the master map to identify a portion of the master map as multiple rooms.

5. The method of claim 1, further comprising assigning an editable label comprising a room name to a portion of the master map.

6. The method of claim 5, wherein the room represented by the editable label is added to a list of rooms.

7. The method of claim 6, wherein the list of rooms is one of a plurality of lists configured to be presented on the display and corresponds to a floor level of the area.

8. The method of claim 6, wherein rooms on the list are selectable for inclusion in or deselectable for exclusion from a cleaning mission.

9. The method of claim 8, further comprising, initiating a transmission to the autonomous cleaning robot comprising instructions to clean the rooms selected on the list.

10. The method of claim 8, further comprising presenting, on the display of the mobile device, a number of rooms to be cleaned in a user-selectable button, wherein selecting the user-selectable button initiates a transmission to the autonomous cleaning robot to begin cleaning.

11. The method of claim 1, wherein the master map is produced after five training maps have been stored.

12. The method of claim 1, further comprising presenting, on the display of the mobile device, an option to begin the training run.

13. The method of claim 1, further comprising presenting, on the display of the mobile device, a list of items to be completed by the user prior to initiating the training run.

14. A handheld computing device comprising:
one or more input devices;
a display; and
a processor configured to:
initiate data transmission and reception with an autonomous cleaning robot,
present, on the display, a graphical representation of a training map depicting portions of an area traversed by the autonomous cleaning robot during a training run,
present, on the display, an interface providing (i) a first option to allow storage of the entire training map depicting the portions of the area that were traversed by the autonomous cleaning robot during the training run and (ii) a second option to allow deletion of the entire training map depicting the portions of the area that were traversed by the autonomous cleaning robot during the training run,
store the entire training map in response to a selection of the first option by a user,
initiate additional training runs to produce additional training maps,
store one or more of the additional training maps in response to a user indication to store each of the one or more additional training maps, and
present a master map generated based on the stored training maps.

15. The device of claim 14, wherein the processor is further configured to present, on the display, a numerical value representing the stored training maps or a percentage of stored training maps relative to a number of training runs used to generate the master map.

16. The device of claim 14, wherein the processor is configured to allow merging portions of the master map to identify a portion of the master map as a room.

17. The device of claim 14, wherein the processor is configured to allow splitting portions of the master map to identify a portion of the master map as multiple rooms.

18. The device of claim 14, wherein the processor is configured to allow assigning an editable label to a portion of the master map, the editable label comprising a room name.

19. The device of claim 18, wherein the processor is further configured to present, on the display, the room represented by the editable label on a list of rooms.

20. The device of claim 19, wherein the list of rooms is one of a plurality of lists configured to be presented on the display and corresponds to a floor level of the area.

21. The device of claim 19, wherein the rooms on the list are selectable for inclusion in or deselectable for exclusion from a cleaning mission.

22. The device of claim 21, wherein the processor is further configured to initiate transmission to the autonomous cleaning robot comprising instructions to clean the rooms selected from the list.

23. The device of claim 21, wherein the processor is further configured to present, on the display, a number of rooms to be cleaned in a user-selectable button, wherein selection of the user-selectable button is configured to initiate a transmission to the autonomous cleaning robot to begin cleaning.

24. The device of claim 14, wherein the master map is produced after five training maps have been stored.

25. The device of claim 14, wherein the processor is further configured to present, on the display, an option to begin the training run.

26. The device of claim 14, wherein the processor is further configured to present, on the display, a list of items to be completed by the user prior to initiating the training run.

* * * * *

UNITED STATES PATENT AND TRADEMARK OFFICE
CERTIFICATE OF CORRECTION

Page 1 of 1

PATENT NO. : 10,835,096 B2
APPLICATION NO. : 16/117484
DATED : November 17, 2020
INVENTOR(S) : O'Dea et al.

It is certified that error appears in the above-identified patent and that said Letters Patent is hereby corrected as shown below:

On the Title Page

Item (72) Inventors, add:
Mario E. Munich, La Canada, CA (US);
Alexander D. Kleiner, Leonberg, (DE)

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*